(12) United States Patent
Lu

(10) Patent No.: US 12,478,368 B2
(45) Date of Patent: Nov. 25, 2025

(54) ENDOSCOPIC SUTURE DEVICE AND OPERATION METHOD THEREOF

(71) Applicant: TAIPEI MEDICAL UNIVERSITY, Taipei (TW)

(72) Inventor: Po-Wen Lu, Taipei (TW)

(73) Assignee: TAIPEI MEDICAL UNIVERSITY, Taipei (TW)

( * ) Notice: Subject to any disclaimer, the term of this patent is extended or adjusted under 35 U.S.C. 154(b) by 425 days.

(21) Appl. No.: 18/150,832

(22) Filed: Jan. 6, 2023

(65) Prior Publication Data

US 2023/0210522 A1 Jul. 6, 2023

Related U.S. Application Data

(60) Provisional application No. 63/296,891, filed on Jan. 6, 2022.

(30) Foreign Application Priority Data

Feb. 25, 2022 (TW) .................................. 111107070

(51) Int. Cl.
*A61B 17/04* (2006.01)

(52) U.S. Cl.
CPC ...... *A61B 17/0469* (2013.01); *A61B 17/0485* (2013.01); *A61B 2017/047* (2013.01)

(58) Field of Classification Search
CPC ............ A61B 17/0469; A61B 17/0485; A61B 17/0467; A61B 17/0062; A61B 17/06066; A61B 17/00234; A61B 17/0625
See application file for complete search history.

(56) References Cited

U.S. PATENT DOCUMENTS

| 5,389,103 | A | * | 2/1995 | Melzer | A61B 17/0469 |
| | | | | | 606/147 |
| 5,674,230 | A | * | 10/1997 | Tovey | A61B 17/0469 |
| | | | | | 606/139 |
| 7,776,066 | B2 | * | 8/2010 | Onuki | A61B 17/0643 |
| | | | | | 606/220 |
| 8,628,545 | B2 | | 1/2014 | Cabrera et al. | |
| 2005/0250988 | A1 | * | 11/2005 | Ewers | A61B 1/0014 |
| | | | | | 600/102 |

(Continued)

FOREIGN PATENT DOCUMENTS

CN 103284770 A 9/2013
WO 2020224262 A1 11/2020

OTHER PUBLICATIONS

TW Office Action dated Nov. 17, 2022 in Taiwan application No. 111107070.

*Primary Examiner* — Tuan V Nguyen
(74) *Attorney, Agent, or Firm* — Nutter McClennen & Fish LLP

(57) ABSTRACT

An endoscope device including an endoscope body, a suture device, and a needle. The endoscope body has a proximal portion and a distal portion opposite each other and includes a working channel. The suture device includes a first arm and a second arm opposite each other. The working channel connects the proximal portion and the distal portion. The first arm and the second arm extend toward a distal direction. At least one of the first arm and the second arm are pivotally connected to the distal portion and can be opened or closed with respect to the other. The operation method thereof is also provided.

25 Claims, 18 Drawing Sheets

(56) References Cited

U.S. PATENT DOCUMENTS

| | | | |
|---|---|---|---|
| 2005/0251176 A1* | 11/2005 | Swanstrom | A61B 17/1114 606/153 |
| 2005/0267529 A1* | 12/2005 | Crockett | A61B 17/0643 606/215 |
| 2006/0122633 A1* | 6/2006 | To | A61B 17/00234 606/139 |
| 2006/0271074 A1* | 11/2006 | Ewers | A61B 17/0401 606/148 |
| 2009/0312775 A1* | 12/2009 | Gilkey | A61B 17/068 606/147 |
| 2019/0133571 A1* | 5/2019 | Racenet | A61B 17/29 |
| 2022/0054156 A1 | 2/2022 | Tang et al. | |

* cited by examiner

ENDOSCOPIC SUTURE DEVICE AND OPERATION METHOD THEREOF

BACKGROUND OF THE INVENTION

1. Field of the Invention

The present invention relates to an endoscopic suture device. Specifically, the present invention relates to an endoscopic suture device configured to suture tissues.

2. Description of the Prior Art

When a surgery of the gastrointestinal tract is performed, it is essential to increase hemostasis rate and ensure the closing of gastrointestinal fistulas and perforations in order to decrease patient mortality. However, the size of the wound and the degree of fibrosis of the surrounding tissues affect the success rate of closing the wound. In addition, it is difficult to achieve the aim of hemostasis when the size of the wound exceeds the threshold of 2 cm.

Therefore, with current technologies, it is difficult to suture fibrotic tissues or wounds of larger sizes using a single medical device.

SUMMARY OF THE INVENTION

The present invention intends to provide an endoscopic suture device which can increase the efficiency of suturing tissues after surgery.

The present invention provides an endoscopic suture device including an endoscope body, a suture device, and a needle. The endoscope body has a proximal portion and a distal portion opposite to each other and further includes a working channel. The suture device is provided to connect to the distal portion and includes a first arm and a second arm opposite to each other. The working channel connects the proximal portion and the distal portion. The first arm and the second arm both extend toward the distal direction.

The first arm and the second arm are pivotally connected to the distal portion and at least one of the first arm and the second arm can be opened or closed with respect to the other. A needle is provided between the first arm and the second arm. Wherein two ends of the needle are respectively and separately connected to the first arm and the second arm.

In an embodiment of the present invention, the endoscopic suture device may also further include additional elements such as a suture terminating device and a tissue capture device (a gripper of tissues).

The present invention further provides an operation method of the aforementioned endoscopic suture device. The operation method includes the following steps: inserting the endoscopic suture device into a target in a second state where the two ends of the needle are respectively connected to both the first end and the second end; switching to a first state where only one of the two ends of the needle is connected to one of the first arm or the second arm after inserting into the target; switching to the second state where the both ends of the needle are respectively connected to the first arm and the second arm after capturing at least a portion of the target so that the needle penetrates at least a portion of the target; and switching to the first state where only the other of the two ends is connected to the other of the first arm or the second arm. Using the endoscope and the operation method provided by the present invention, large wounds, fibrosis tissues, fistulas or stomach spaces can be stitched and sutured, and situations such as relapsing of hemorrhage, gastrointestinal perforation, and allimentary space can also be decreased.

DETAILED DESCRIPTION OF THE PREFERRED EMBODIMENT

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

Terms used here merely intend to describe the specific embodiments and do not intend to limit the scope of the present disclosure. In the specifications, if there exist no clear indications, terms in singular forms such as "a/an", "one", and "the" mean to include plural forms, including "at least one." "Or" means "and/or". As used in the specifications, the term "and/or" includes one or more of any combinations of related items. It should be noted that the terms "include" or "comprise" used in the specifications specify the existences of the said features, overall regions, steps, operations, elements and/or components; however, it does not exclude one or more additional features, overall regions, steps, operations, elements, components, and/or the combinations thereof.

In addition, relative terms such as "lower" or "bottom" and "on" or "top" may be used to describe the relationship between an element and another element in the present specifications, as shown in the FIGs. It should be understood that the purpose of using relative terms is to include the different directions of the devices not shown in the FIGs. For example, if a device in an attached FIG is turned upside down, an element described as being "under" another element will be "on top of" that element. Therefore, a descriptive term "under" may include the meaning of both "under" and "on top of", depending on the specific orientation of the attached FIG.

Figure 1A:
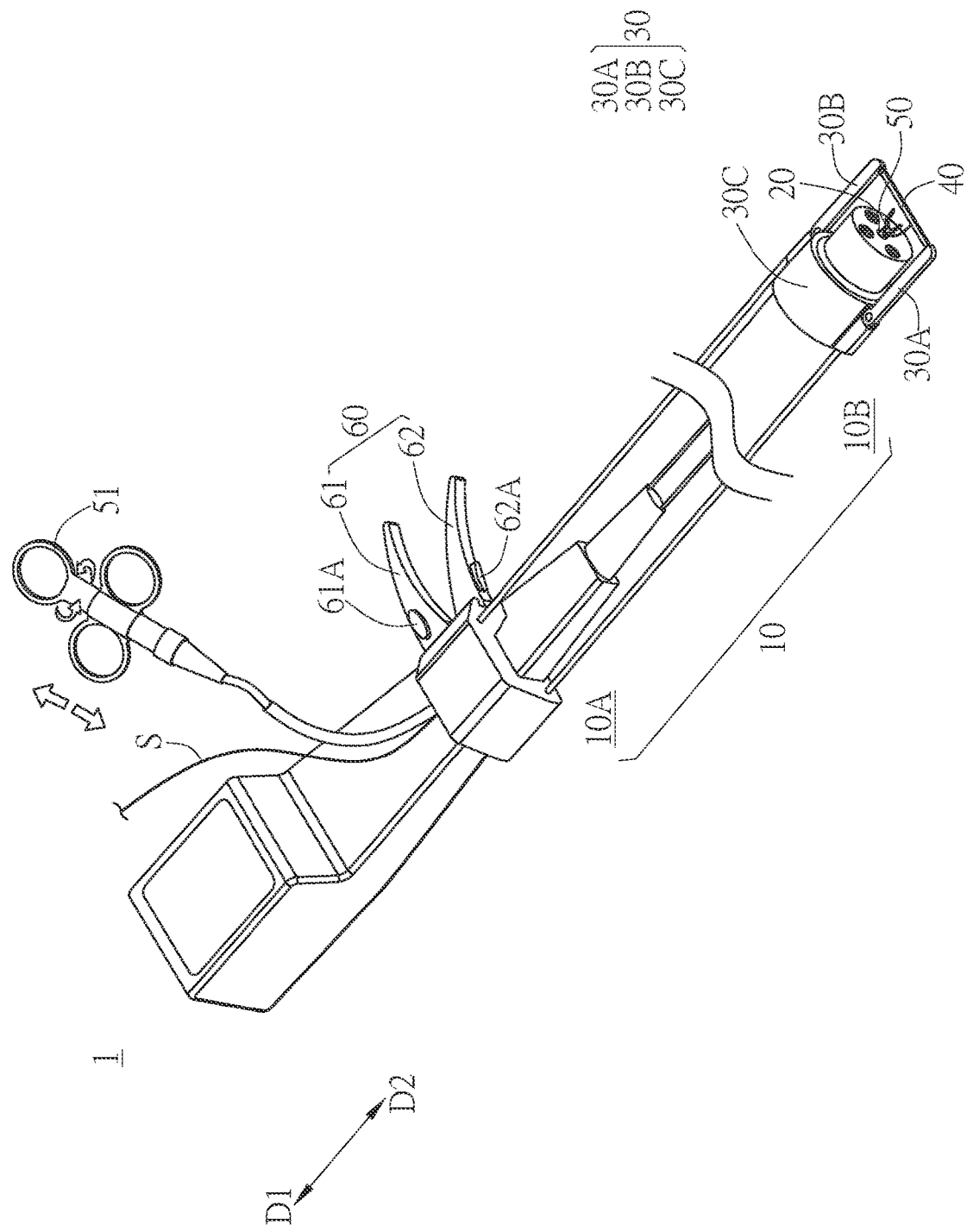
FIG. 1A is a three-dimensional diagram illustrating an embodiment of the endoscopic suture device of the present invention.
Figure 1B:
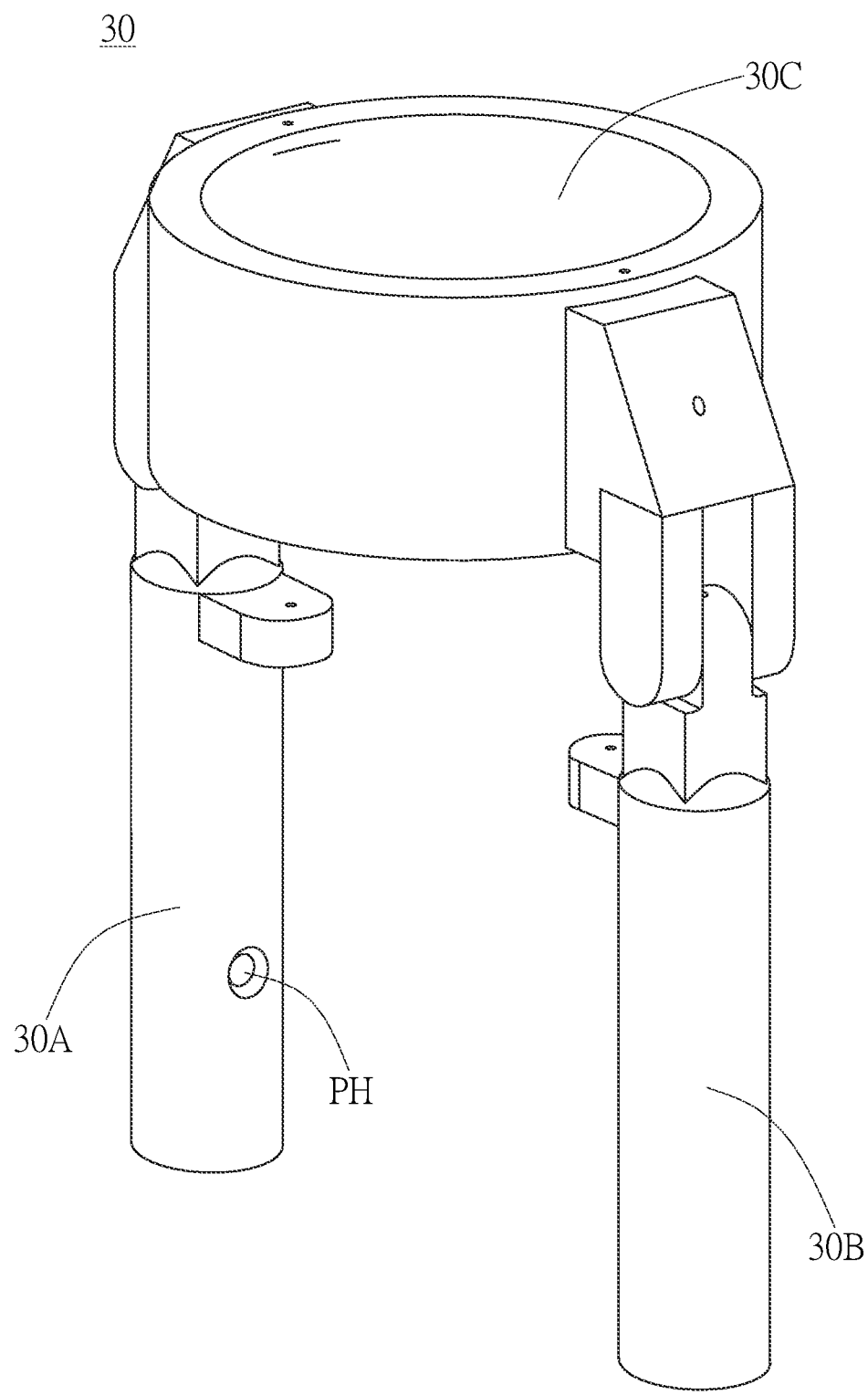
FIG. 1B is a three-dimensional diagram illustrating a suture device in an embodiment of the endoscopic suture device of the present invention.

Please refer to FIG. 1A. FIG. 1A illustrates a three-dimensional diagram of an embodiment of the endoscopic suture device of the present invention1. As illustrated in FIG. 1A, an endoscopic suture device 1 includes an endoscope body 10, a suture device 30, and a needle 40. Wherein the endoscope body 10 has a proximal portion 10A and a distal portion 10B opposite to each other, and a working channel 20 connecting the proximal portion 10A and the distal portion 10B so that the required tools can arrive and work at the distal portion 10B from the proximal portion 10A closer to the user. Next, please refer to FIG. 1B. FIG. 1B illustrates a three-dimensional diagram of the suture device 30 in an embodiment of the endoscopic suture device of the present invention. As illustrated in FIG. 1B, the suture device 30 includes a first arm 30A, a second arm 30B, and an arm connection mechanism 30C connecting the first arm 30A and the second arm 30B. In an embodiment of the present invention, a tissue capture device 50 is in the working channel 20. In addition, at least a portion of the tissue capture device 50 protrudes toward a distal direction D2 from the working channel 20 and is operated by a capture operation unit 51 located at the proximal portion 10A. In an embodiment, the tissue capture device 50 may be a clamp-shaped device; however, in another embodiment, the tissue capture device 50 may be a module having a pinhead, and the tissue capture device 50 of the present invention is not limited thereto.

As illustrated in FIG. 1A, the suture device 30 is configured to connect to the distal portion 10B via the arm connection mechanism 30C so that the first arm 30A and the second arm 30B are opposite to each other and extend toward the distal direction D2, respectively. The first arm 30A and the second arm 30B each connects to the distal portion 10B. And one of them can be opened and closed with respect to the other. The needle 40 is disposed between the first arm 30A and the second arm 30B and is disposed at a side different from the arm connection mechanism 30C. In the present embodiment, two ends of the needle 40 are selectively and respectively connected to the first arm 30A and the second arm 30B. For example, as illustrated in FIG. 1B, the first arm 30A and the second arm 30B each has a pinhole PH. And an end of the needle 40 is connected to the pinhole PH.

In the present embodiment, the endoscopic suture device 1 may further include a suture S. In an actual operation, the suture S may be connected to the needle 40 via the working channel 20. For example, the center portion of the needle 40 may have a pinhole to allow the suture S to pass through. And the suture S may be connected to the needle 40 via the pinhole. One end of the suture is connected to the needle 40 and the other end of the suture protrudes toward a proximal direction D1 from the working channel 20.

As shown below, the relations between the needle 40, the first arm 30A, and the second arm 30B are described in detail with reference to FIGS. 2A-2C.

Figures 2A, 2B, 2C:
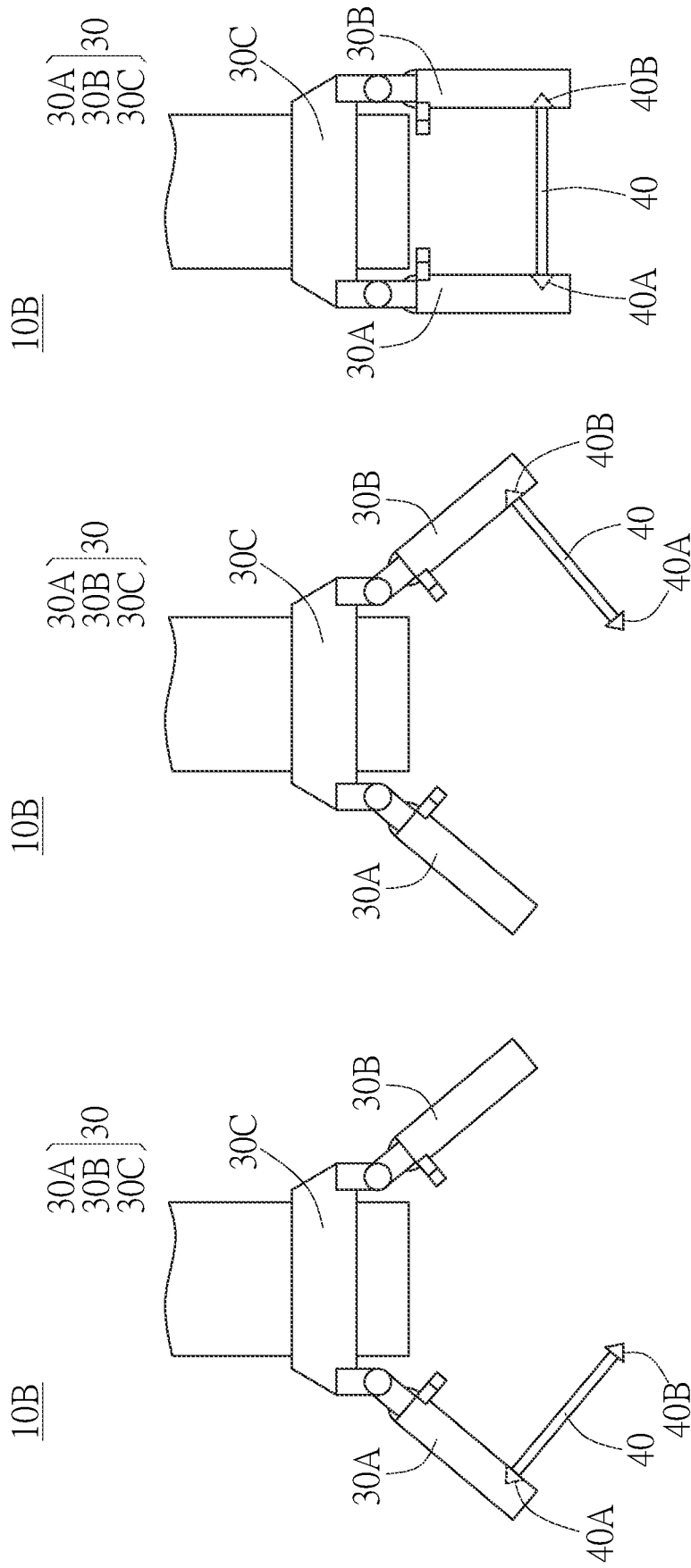
FIG. 2A is a diagram illustrating the distal portion of the endoscopic suture device of the present invention in a first state in which a first tip of a needle is connected to a first arm.
FIG. 2B is a diagram illustrating the distal portion of the endoscopic suture device of the present invention in another first state in which a second tip of the needle is connected to a second arm.
FIG. 2C is a diagram illustrating the distal end of the endoscopic suture device of the present invention in a second state in which the first tip and the second tip are respectively connected to the first arm and the second arm

FIGS. 2A, 2B, and 2C are diagrams illustrating the distal portion 10B of the endoscopic suture device 1 when an end of the needle 40 is connected to the first arm 30A, when the other end thereof is connected to the second arm 30B, and when two ends of the needle 40 are respectively connected to the first arm 30A and the second arm 30B, respectively. Specifically, the needle 40 has a first tip 40A and a second tip 40B opposite to each other. When the needle 40 is connected to the first arm 30A, the needle 40 is connected to the first arm 30A via the first tip 40A. In addition, the first tip 40A is covered by the first arm 30A and does not protrude out of the first arm 30A to prevent the first tip 40A from injuring tissues around it. Similarly, when the needle 40 is connected to the second arm 30B, the needle 40 is connected to the second arm 30B via the second tip 40B. In addition, the second tip 40B is covered by the second arm 30B and does not protrude out of the second arm 30B. As shown below, the state in which only one of the two ends (that is, the first tip 40A and the second tip 40B) of the needle 40 is connected to either the first arm 30A or the second arm 30B is called the first state (FIG. 2A and FIG. 2B), and the state in which the first tip 40A and the second tip 40B are respectively connected to the first arm 30A and the second arm 30B is called the second state (FIG. 2C).

Furthermore, in the first state illustrated in FIG. 2A or FIG. 2B, one of the first arm 30A and the second arm 30B is open with respect to the other so that the extending directions of the first arm 30A is at least not parallel to the second arm 30B. On the other hand, in the second state illustrated in FIG. 2C, one of the first arm 30A and the second arm 30B extends to the direction parallel to the other so that the distance between the first arm 30A and the second arm 30B is minimized. In other words, when switching to the second state from the first state, either the first arm 30A or the second arm 30B is configured to move towards the other.

Please refer to FIG. 1A again. In the present embodiment, the endoscopic suture device 1 further includes a control device 60 provided on the proximal portion 10A and is configured to switch between the first state (FIG. 2A or 2B) and the second state (FIG. 2C) using the control device 60. Specifically, the control device 60 includes a first portion 61 and a second portion 62 so as to form a structure similar to a handle. the first portion 61 and the second portion 62, for example, are respectively and mechanically connected to the first arm 30A and the second arm 30B so as to control the first arm 30A and the second arm 30B, respectively.

A first switching portion 61A and a second switching portion 62A are provided on the first portion 61 and the second portion 62, respectively. The first switching portion 61A and the second switching portion 62A are electrically or mechanically connected to the first arm 30A and the second arm 30B, respectively.

In the present embodiment, in the case that the endoscopic suture device 1 is originally set in the first state (FIG. 2A or FIG. 2B), the user holds the first portion 61 and the second portion 62 opposite to each other and at the same time shorten the distance between them without contacting the first switching portion 61A or the second switching portion 62A, the first arm 30A and the second arm 30B are pulled closer to each other and the device is switched to the second state. In the second state, the first tip 40A and the second tip 40B are connected to the first arm 30A and the second arm 30B, respectively. When the endoscopic suture device 1 is in the second state, the endoscopic suture device 1 can be switched to the first state by selectively pushing/pulling the first switching portion 61A or the second switching portion 62A. For example, when the second switching portion 62A is pushed, the endoscopic suture device 1 is switched to the first state so that the second tip 40B is separated from the second arm 30B (switching the state to that in FIG. 2A from FIG. 2C) while the first tip 40A is kept connected to the first arm 30A. Similarly, when the first switching portion 61A is pushed, the first tip 40A is separated from the first arm 30A (switching the state to that in FIG. 2B from FIG. 2C) while the second tip 40B is kept connected to the second arm 30B.

Figure 3:
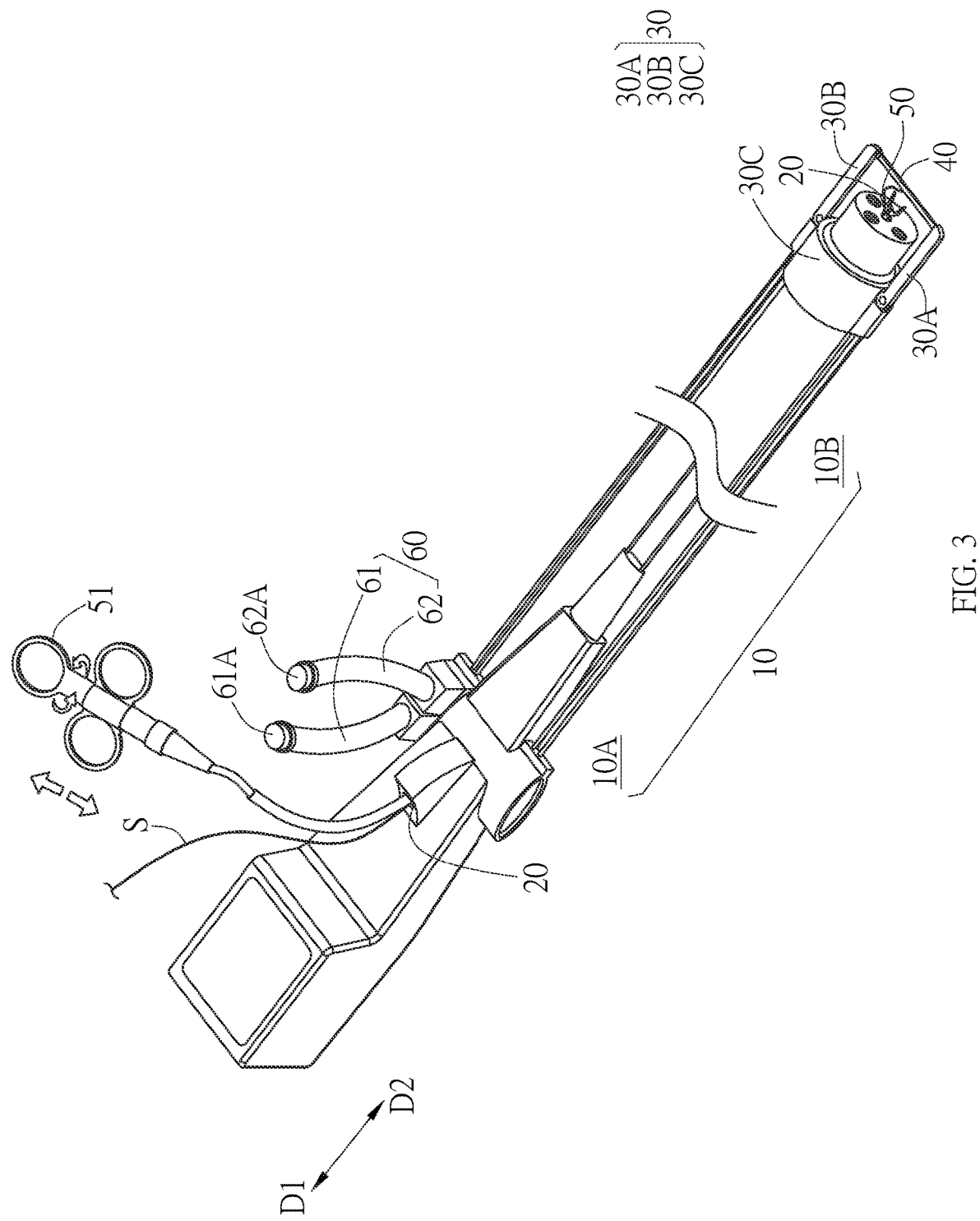
FIG. 3 is a three-dimensional diagram illustrating another embodiment of the endoscopic suture device of the present invention.

In the embodiment illustrated in FIG. 1A, the first portion 61 and the second portion 62 are provided on a side surface of the proximal portion 10A and extend to directions different from the extending direction of the endoscope body 10. Specifically, the extending directions of the first portion 61 and the second portion 62 may be approximately perpendicular to the extending direction of the endoscope body 10. However, the extending directions of the first portion 61 and the second portion 62 in the present invention are not limited to the embodiment illustrated in FIG. 1A. For example, FIG. 3 illustrates a variant of the embodiment of the endoscopic suture device 1 of the present invention; and in the variant of the embodiment illustrated in FIG. 3, the first portion 61 and the second portion 62 are provided on a side surface of the proximal portion 10A, respectively and the axis direction of the pin connection of the first portion 61 and the second portion 62 is perpendicular to or approximately perpendicular to the endoscope body 10. Through such a configuration, when the user disposes a display screen at the rear of the proximal portion 10A, it is convenient for the user to operate the first portion 61 and the second portion 62 while viewing the rear display screen (not illustrated). In the variant of the embodiment illustrated in FIG. 3, the first switching portion 61A and the second switching portion 62A are preferably disposed on the end of the first portion 61 and the second portion 62 opposite to the endoscope body 10, respectively, so as to avoid pushing the first switching portion 61A or the second switching portion 62A while holding the first portion 61 and the second portion 62; however, locations where the first switching portion 61A or the second switching portion 62A is disposed are not limited thereto. In addition, in the embodiments illustrated in FIG. 1A and FIG. 3, the first switching portion 61A and the second switching portion 62A may be buttons; however, in another embodiment, pull-type switches may also be used.

In the aforementioned embodiments, the connection between the needle 40 and the first arm 30A/the second arm 30B can be controlled via the control device 60 which includes the first portion 61 and the second portion 62; however, the configurations of the control device 60 are not limited to the aforementioned embodiments. The connection between the needle 40 and the first arm 30A/the second arm 30B may also be controlled via other mechanisms.

Figure 4:
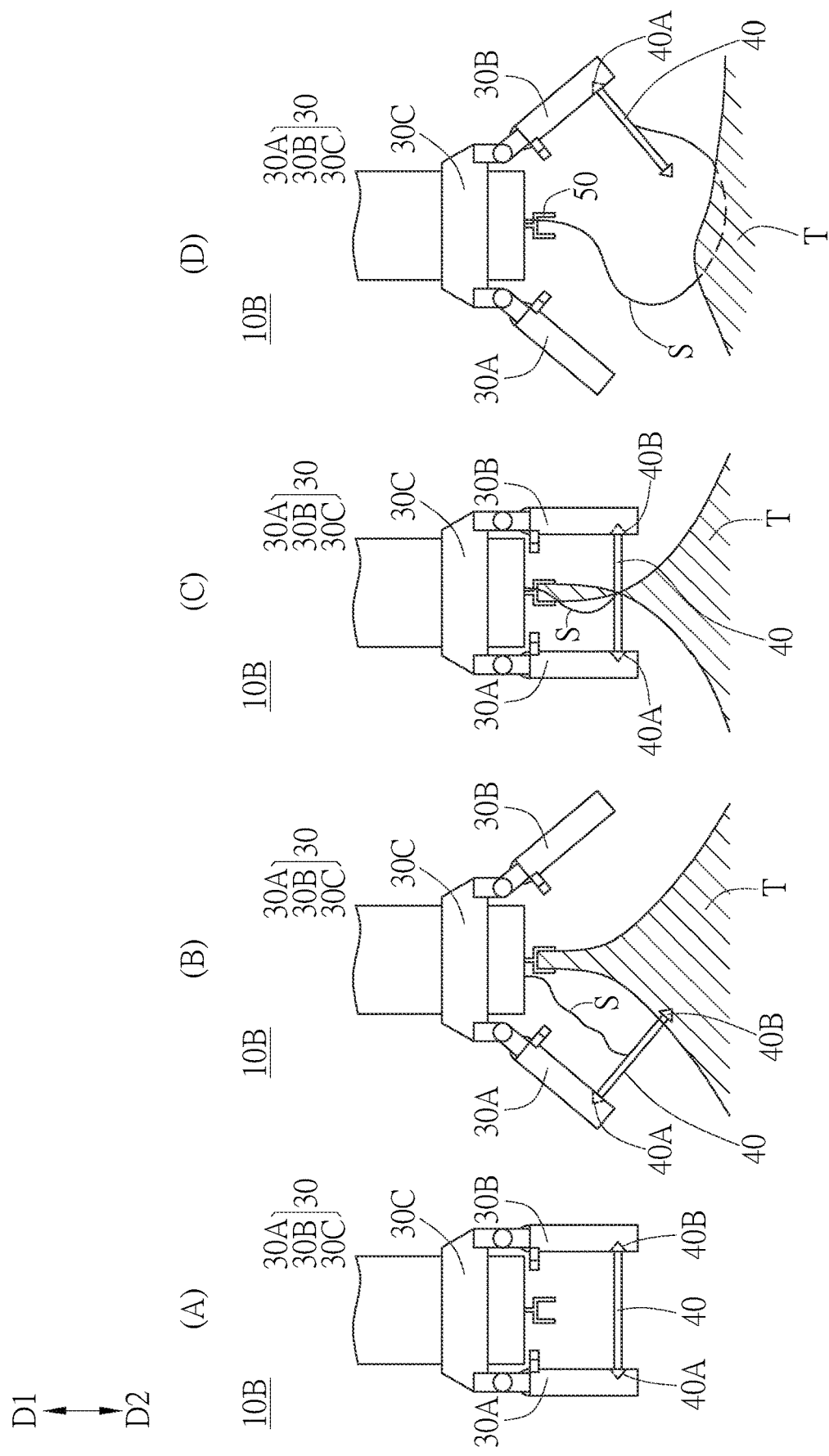
FIG. 4 is a diagram illustrating an operation method of the endoscopic suture device of the present invention.

Next, an operation method of the endoscopic suture device 1 in the aforementioned embodiments will be described in detail. FIG. 4 is a diagram illustrating an operation method of the endoscopic suture device 1. As illustrated in FIG. 4, when inserted into the body of a subject, the endoscopic suture device 1 is set to the second state at first (as illustrated in FIG. 2C) (A). When it has been inserted and is approaching the target T (for example, tissues such as stomach walls), the endoscopic suture device 1 is switched to the first state (either FIG. 2A or FIG. 2B. In the embodiment of FIG. 4, it is switched to the state in FIG. 2A as an example), so as to open the first arm 30A and the second arm 30B. After that, at least a portion of the target T is moved to a location between the first arm 30A and the second arm 30B using the tissue capture device 50 protruding toward the distal direction D2 from the working channel 20 (B); and then the endoscopic suture device 1 is switched to the second state (C). At that time, either one of the first tip 40A or the second tip 40B passes through the target T and the target T is disposed between the first arm 30A and the second arm 30B. For example, when switching to the second state from the first state illustrated in FIG. 2A, the second tip 40B passes through a portion of the target T. Similarly, when switching to the second state from the first state illustrated in FIG. 2B, the first tip 40A passes through the target T.

In the aforementioned embodiment, as illustrated in FIG. 1A or FIG. 3, the suture S is installed on the needle 40 via the working channel 20; therefore, when the first tip 40A or the second tip 40B passes through the target T, the suture S may also pass through the target T so as to stitch the target T. Then, after the endoscopic suture device 1 is switched to the first state (the other one of FIG. 2A or FIG. 2B. In the embodiment of FIG. 4, it is switched to the state of FIG. 2B for example (D)), a portion of the target T is captured and the aforementioned operations are performed repeatedly so as to perform the suturing of the target T. In the embodiment illustrated in FIG. 4, the needle 40 may be a straight needle; however, in another embodiment, the needle 40 may also be a curved needle.

Figure 5A:
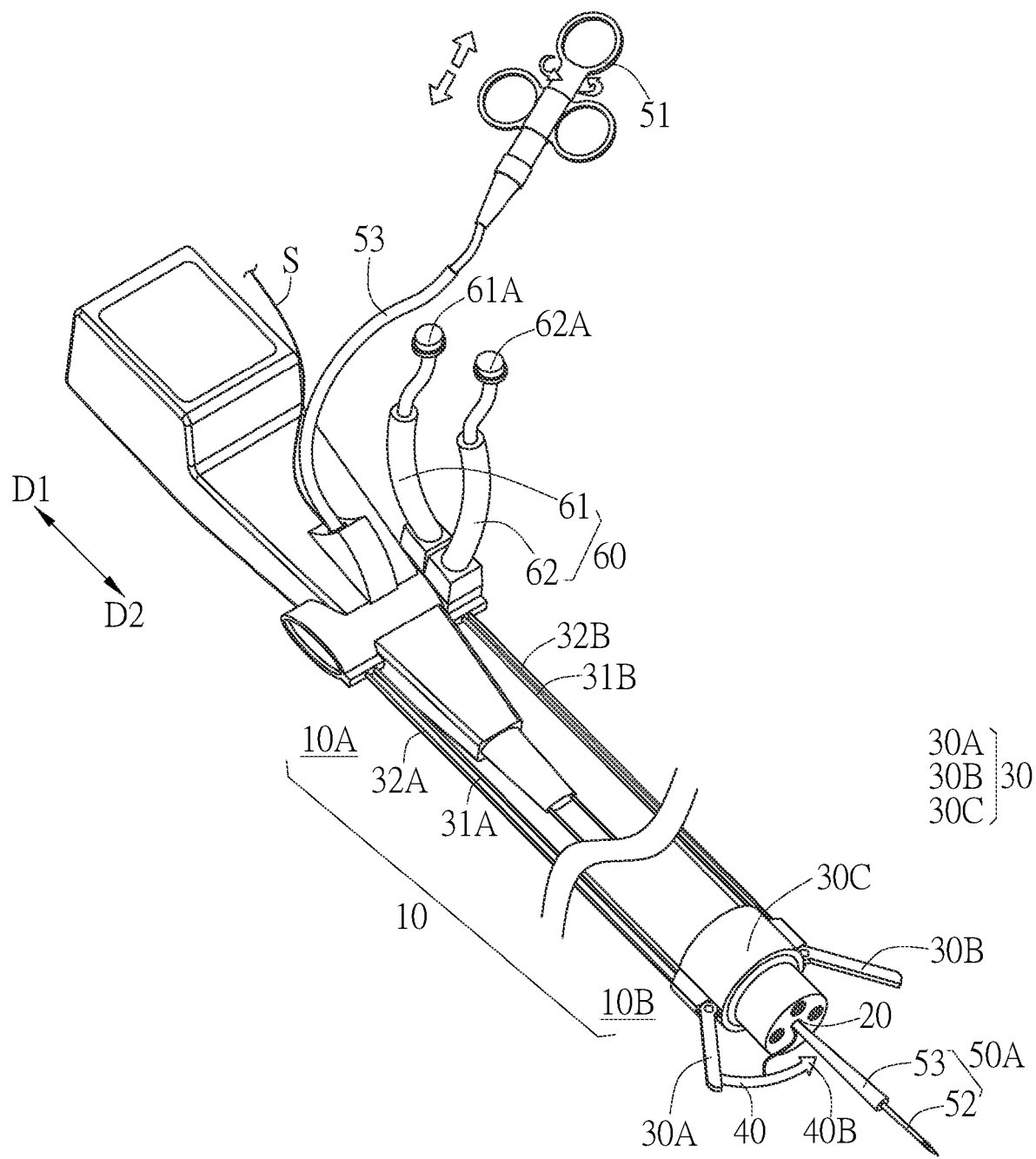
FIG. 5A is a diagram illustrating another embodiment of the endoscopic suture device of the present invention.

Please refer to FIG. 5A. FIG. 5A is a diagram illustrating another embodiment of the endoscopic suture device of the present invention1. As illustrated in FIG. 5A, in the present embodiment, a needle-shaped capture module 50A is used as the tissue capture device to take the place of the clamp-shaped tissue capture device 50. The needle-shaped capture module 50A includes a capture operation unit 51, a needle-shaped capturing portion 52, and a needle outer tube53. The needle-shaped capturing portion 52 is provided to at least partially protrude toward the distal direction D2 from the working channel 20. And the capture operation unit 51 is connected to the needle-shaped capturing portion 52 via the working channel 20. The needle outer tube 53 is at least partially disposed in the working channel 20. Two ends of the needle outer tube 53 protrude toward the proximal direction D1 and the distal direction D2, respectively, from the working channel 20. Furthermore, the capture operation unit 51 and the needle-shaped capturing portion 52 are at least partially covered by the needle outer tube 53. In addition, the needle-shaped capturing portion 52 at least partially protrudes toward the distal direction D2 from the needle outer tube 53. Therefore, the capture operation unit 51 and the straight needle-shaped capturing portion 52 are located at opposite sides of the needle outer tube 53.

In the present embodiment, the needle-shaped capturing portion 52 can perform a rectilinear motion toward the proximal direction D1 or the distal direction D2 or perform a rotational motion along with the capture operation unit 51 using the rectilinear motion or the rotational motion of the capture operation unit 51. However, the tissue capture device of the present invention is not limited to the tissue capture device 50 or the needle-shaped capture module 50A, and the target can also be captured by other ways.

Figure 5B:
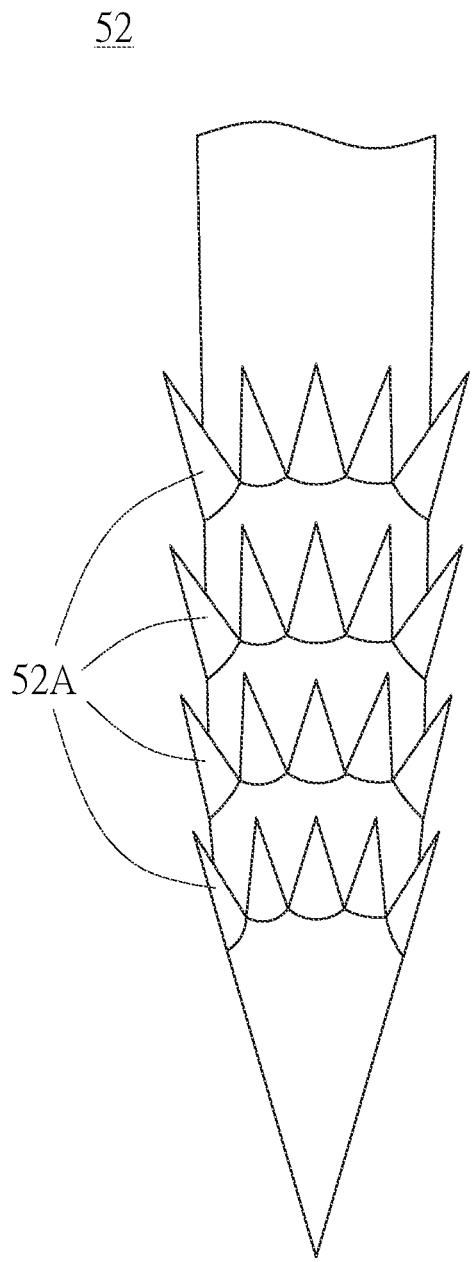
FIG. 5B is an enlarged diagram illustrating a needle-shaped capture portion of the tissue capture device in the embodiment illustrated in FIG. 5A.

FIG. 5B is an enlarged diagram of the needle-shaped capturing portion 52 of the embodiment illustrated in FIG. 5A. As illustrated in FIG. 5B, in the present embodiment, a plurality of barb structures 52A are provided on the needle-shaped capturing portion 52. The barb structures 52A, for example, may be distributed to form a shape of fish scales. By providing the barb structures 52A, the needle-shaped capturing portion 52 can be prevented from being separated from the target unexpectedly after the needle-shaped capturing portion 52 is inserted into the target. However, the way of distribution of the barb structures 52A is not limited to the shape illustrated in FIG. 5B. The needle-shaped capturing portion 52 can also be prevented from being separated from the target using other ways.

Figure 6:
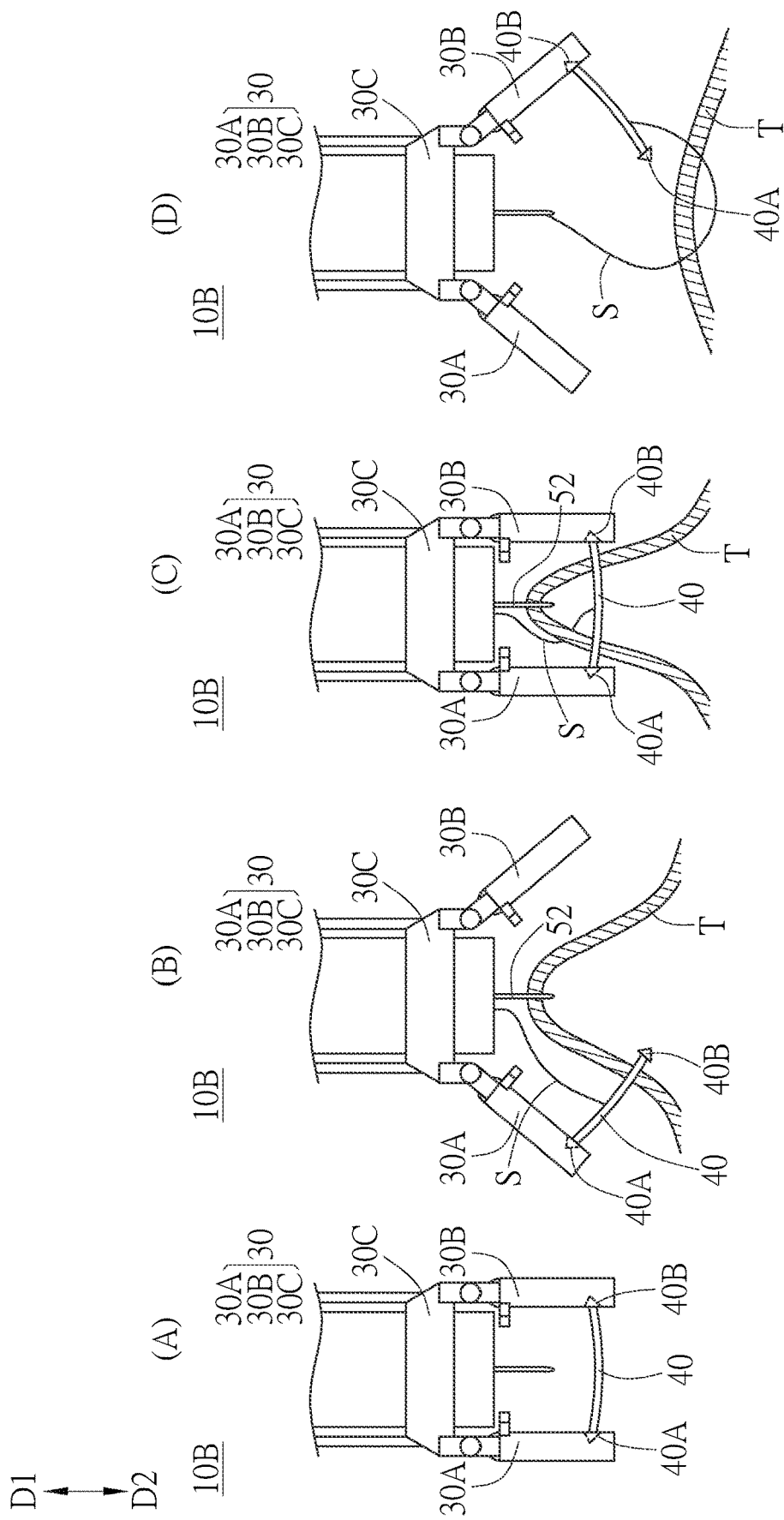
FIG. 6 is a diagram illustrating an operation method of the endoscopic suture device of the present invention in another embodiment.

FIG. 6 illustrates an operation method of the endoscopic suture device of the present invention1 in another embodiment. Similar to the embodiment illustrated in FIG. 4, when the endoscopic suture device 1 is inserted into a body of the subject, the endoscopic suture device 1 should be set to the second state (A). When the endoscopic suture device 1 approaches the target T, the endoscopic suture device 1 is switched to the first state (In the present embodiment, the first tip 40A is connected to the first arm 30A, for example), and the needle-shaped capturing portion 52 is moved toward the distal direction D2 using the capture operation unit 51 as illustrated in FIG. 5A so that the needle-shaped capturing portion 52 is moved toward the proximal direction D1 using the capture operation unit 51 after inserting it into the target T. Therefore, at least a portion of the target T is located between the first arm 30A and the second arm 30B (B). In the present embodiment, the needle-shaped capturing portion 52 has the barb structures 52A (FIG. 5B); hence it can be kept inserted into the target T. A portion of the target T can be kept located between the first arm 30A and the second arm 30B by fixing the location of the needle-shaped capturing portion 52. Then, the endoscopic suture device 1 is switched to the second state so that an end of the needle 40 passes through a portion of the target T located between the first arm 30A and the second arm 30B (C). At that time, the suture S installed on the needle 40 passes through a portion of the target corresponding to the needle 40. Then, the endoscopic suture device 1 is switched back to the first state (In the present embodiment, the second tip 40B is connected to the second arm 30B as an example. The needle 40 is preferably connected to a different arm from the previous first state) and the needle-shaped capturing portion 52 performs a rotational motion to release the needle-shaped capturing portion 52 from the state of being inserted into the target T by rotating the capture operation unit 51 (D). By repeating the operations of (B) to (D), the suturing operation to the target T is performed.

Next, the detailed embodiment of the mechanisms of two ends of the needle 40 being connected to the first arm 30A and the second arm 30B will be described. Please refer to FIG. 5A. As illustrated in FIG. 5A, in the present embodiment, the control device 60 includes a first releasing control connection line 31A and a first opening and closing control connection line 32A extending along the endoscope body 10 from the proximal portion and connected to the first arm 30A, and a second releasing control connection line 31B and a second opening and closing control connection line 32B extending along the endoscope body 10 from the proximal portion and connected to the second arm 30B. Specifically, the first releasing control connection line 31A, the first opening and closing control connection line 32A and the second releasing control connection line 31B and the second opening and closing control connection line 32B are located at opposite sides of the endoscope body 10 and extend in parallel to each other. Wherein, the first releasing control connection line 31A, the first opening and closing control connection line 32A, the second releasing control connection line 31B, and the second opening and closing control connection line 32B preferably are wires with spring forces.

In the present embodiment, the first opening and closing control connection line 32A is controlled by the first portion 61; the first releasing control connection line 31A is controlled by the first switching portion 61A. Therefore, the first opening and closing control connection line 32A is configured to control the opening and closing of the first arm 30A. And the first releasing control connection line 31A is configured to control the releasing of the connection between the first arm 30A and the first tip 40A of the needle 40. Similarly, the second opening and closing control connection line 32B is controlled by the second portion 62; the second releasing control connection line 31B is controlled by the second switching portion 62A. Therefore, the second opening and closing control connection line 32B is configured to control the opening and closing of the second arm 30B, and the second releasing control connection line 31B is configured to control the connection between the second arm 30B and the second tip 40B of the needle 40. By providing the first releasing control connection line 31A and the first opening and closing control connection line 32A, and the second releasing control connection line 31B and the second opening and closing control connection line 32B on opposite sides of the endoscope body 10, respectively, the mechanical connection between the control device 60 and the first arm 30A and that between the control device 60 and the second arm 30B can be established. In the present embodiment, the opposite two sides of the endoscope body 10 have two lines provided respectively; however, in a different embodiment, the first releasing control connection line 31A and the first opening and closing control connection line 32A may also be integrated into the same wire. In addition, the second releasing control connection line 32A and the second opening and closing control connection line 32B may also be integrated into the same wire (that is, each of the opposite two sides of the endoscope body 10 has a single wire). The connection method between the first portion 61 and the first switching portion 61A and the first arm 30A, and the connection method between the second portion 62 and the second switching portion 62A and the second arm 30B are not limited to the aforementioned embodiments.

In the present embodiment, the first switching portion 61 and the second switching portion 62A preferably are pull-type switches. By using the pull-type switches, when the first switching portion 61A is pulled, the first releasing control connection line 31A can be moved toward the proximal direction D1 so that the connection between the first arm 30A and the needle 40 can be released (removed). Similarly, when the second switching portion 62A is pulled, the second releasing control connection line 31B can be moved toward the proximal direction D1 so that the connection between the second arm 30B and the needle 40 can be released (removed). However, the first switching portion 61A and the second switching portion 62A in the present invention are not limited thereto. The first switching portion 61A and the second switching portion 62A can be button-type switches as illustrated in FIG. 1A or FIG. 3 and they can be configured to drive the first releasing control connection line 31A and the second releasing control connection line 31B using an electrical connection or mechanical connection. The detailed principles of the connection between the first tip 40A (the second tip 40B) and the first arm 30A (the second arm 30B) are described below.

Figure 7B:
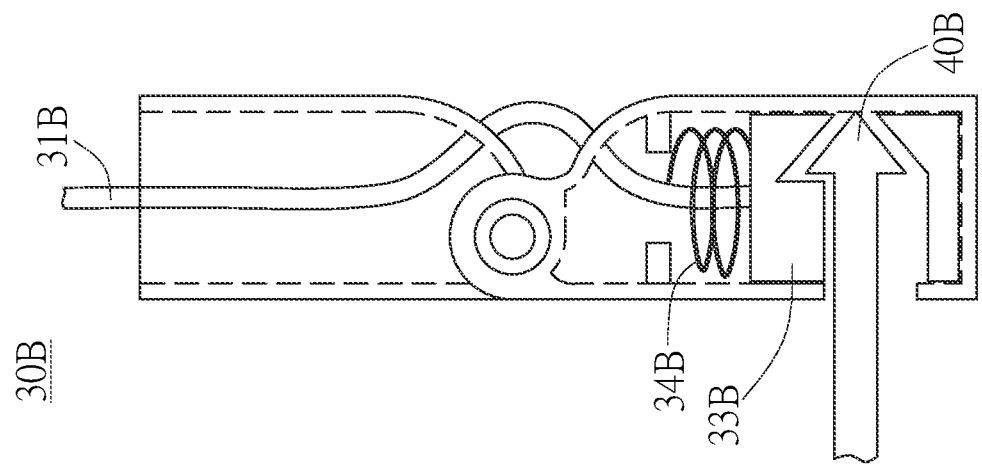
FIG. 7B is a cross-section diagram illustrating the second arm in the embodiment illustrated in FIG. 6.
Figure 7A:
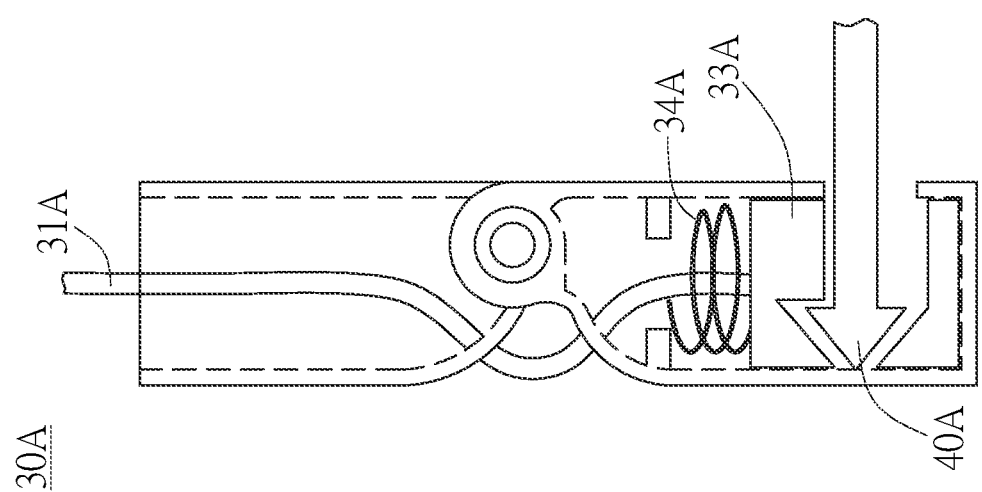
FIG. 7A is a cross-section diagram illustrating the first arm in the embodiment illustrated in FIG. 6.

FIG. 7A and FIG. 7B illustrate cross-section diagrams of the first arm 30A and the second arm 30B in the embodiment illustrated in FIG. 5A, respectively. As illustrated in FIG. 7A, in the present embodiment, the first arm 30A further has a first connection portion 33A and a first elastic element 34A (such as a spring). An end of the first releasing control connection line 31A extending to the first arm 30A is connected to the first connection portion 33A; therefore, the first connection portion 33A is controlled by the first releasing control connection line 31A to release the first tip 40A. The first elastic element 34A (such as a spring) is provided at the junction between the first releasing control connection line 31A and the first connection portion 33A.

Specifically, when the first tip 40A is inserted into the first arm 30A, the first connection portion 33A is squeezed by the first tip 40A and shifted toward the proximal direction D1. After a certain ratio of the first tip 40A is inserted into the first arm 30A, the top end of the guide surface of the first tip 40A passes through the junction, so that the first connection portion 33A is bounced back by the first elastic element 34A to hold the first tip 40A in the first arm 30A. In addition, when the first releasing control connection line 31A is pulled toward the proximal direction D1, the first connection portion 33A is also released toward the proximal direction, so that the first tip 40A is released from the first arm 30A to remove the connection.

Similarly, as illustrated in FIG. 7B, the second arm 30B further has a second connection portion 33B and a second elastic element 34B. An end of the second releasing control connection line 31B extending to the second arm 30B is connected to the second connection portion 33B; therefore, the second connection portion 33B is controlled by the second releasing control connection line 31B to release the second tip 40B. The second elastic element 34B (such as a spring) is provided at the junction between the second releasing control connection line 31B and the second connection portion 33B. When the second tip 40B is inserted into the second arm 30B, the second connection portion 33B is squeezed by the second tip 40B and shifted toward the proximal direction D1. When a certain ratio of the second tip 40B is inserted into the second arm 30B, the top end of the guide surface of the second tip 40B passes through the junction, so that the second connection portion 33B is bounced back by the second elastic element 34B to hold the second tip 30B in the second arm 30B. In addition, when the second releasing control connection line 31B is pulled toward the proximal direction D1, the second connection portion 33B is released toward the proximal direction, so that the second tip 40B is released from the second arm 30B to remove the connection.

In the present embodiment, since the first releasing control connection line 31A and the second releasing control connection line 31B are controlled by the first switching portion 61A and the second switching portion 62A, respectively, when the second switching portion 62A is pulled, the second releasing control connection line 31B is pulled toward the proximal direction D1, so that the first tip 40A is kept connected to the first arm 30A while the second tip 40B is released from the second arm 30B. Similarly, when the first switching portion 61A is pulled, the first releasing control connection line 31A is pulled toward the proximal direction D1, so that the second tip 40B is kept connected to the second arm 30B while the first tip 40A is released from the first arm 30A.

As described above, the control device 60 can be mechanically or electrically connected to the first arm 30A and the second arm 30B by providing two connecting wires on the two side surfaces of the endoscope body 10 so as to control the connection state between the needle 40 and the first arm 30A and that between the needle 40 and the second arm 30B. However, the control device 60 and the connection methods between the control device 60 and the first arm 30A or the second arm 30B are not limited thereto. The first arm 30A and the second arm 30B can also be controlled by wireless signals or an external control device. In addition, in another embodiment, on two sides of the endoscope body 10, only the first releasing control connection line 31A and the second releasing control connection line 31B may be provided and the first opening and closing control connection line 32A and the second opening and closing control connection line 32B may not be provided. In addition, the first portion 61 (the second portion 62) and the first arm 30A (the second arm 30B) may be mechanically connected via other ways so as to control the opening and closing of the first arm 30A and the second arm 30B. The mechanisms to control the first arm 30A and the second arm 30B are not limited to the aforementioned embodiment.

Figure 8A:
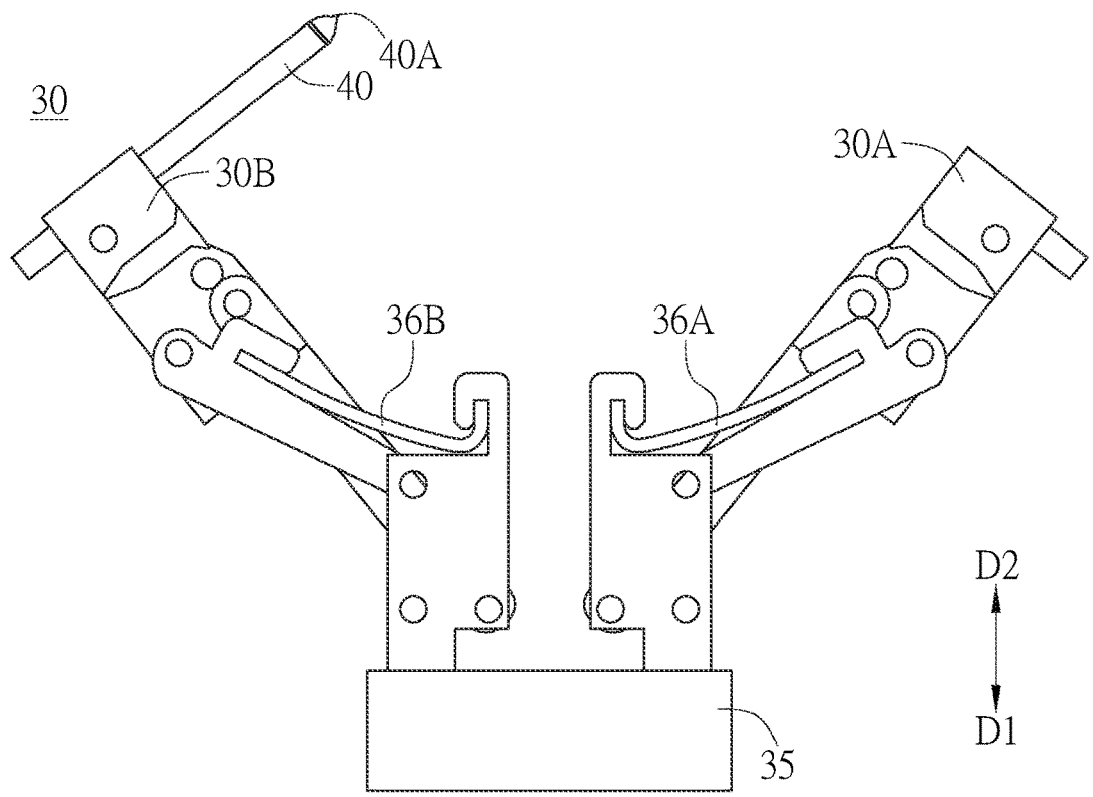
FIG. 8A is a side diagram illustrating the suture device in a varied embodiment of the endoscopic suture device of the present invention in a first state in the first arm and the second arm are opened with respect to each other.
Figure 8B:
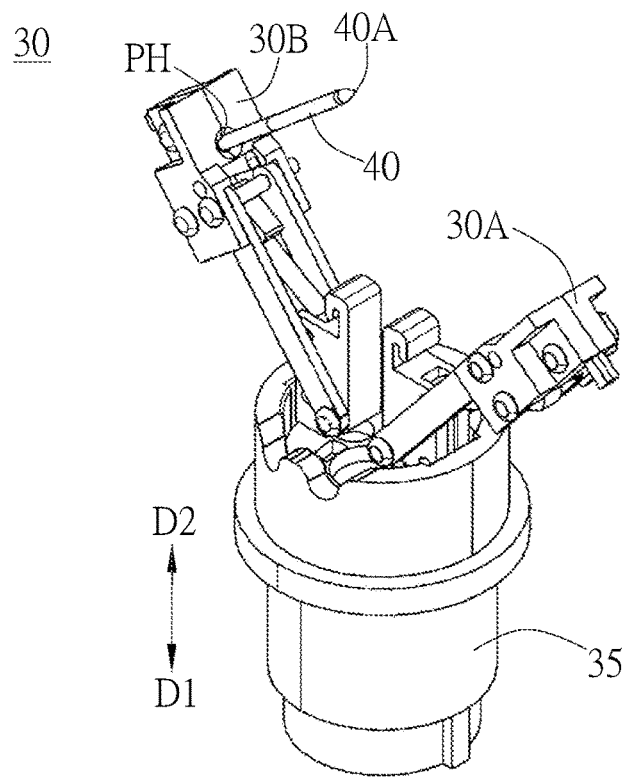
FIG. 8B is a three-dimensional diagram illustrating the suture device in a varied embodiment of the endoscopic suture device of the present invention in the first state in the first arm and the second arm are opened with respect to each other.
Figure 8C:
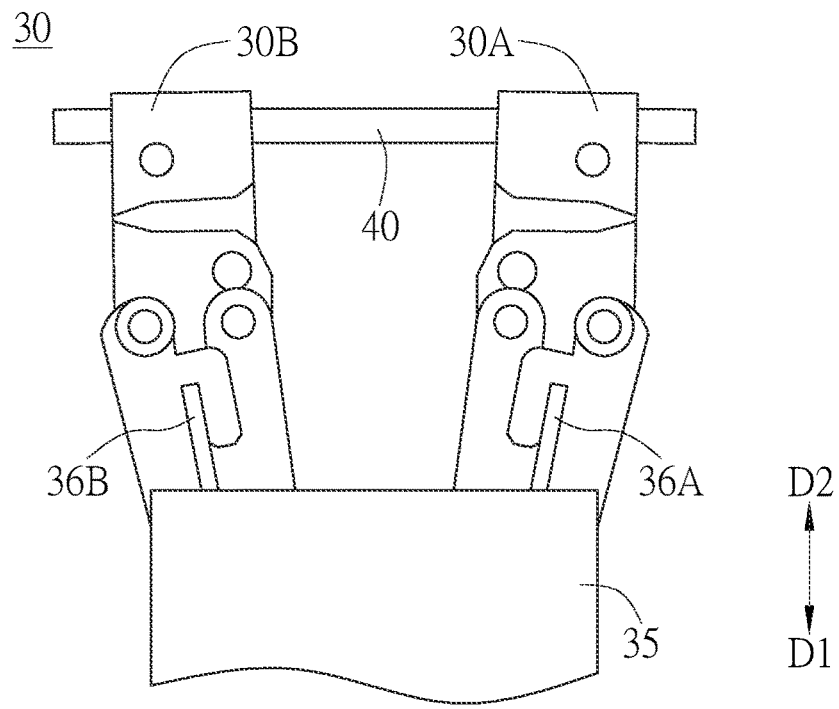
FIG. 8C is a side diagram illustrating the suture device in a varied embodiment of the endoscopic suture device of the present invention in a second state in the first arm and the second arm are with respect to each other.
Figure 8D:
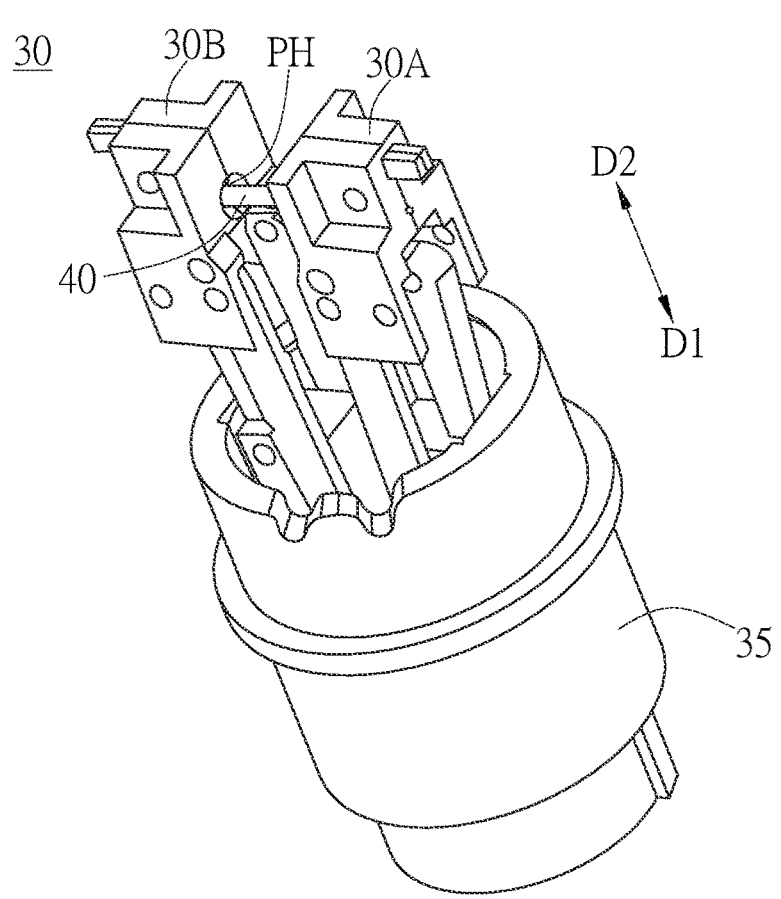
FIG. 8D is a three-dimensional diagram illustrating the suture device in a varied embodiment of the endoscopic suture device of the present invention in a second state in the first arm and the second arm are closed with respect to each other.

Please refer to FIGS. 8A, 8B, 8C, and 8D. FIG. 8A and FIG. 8B respectively illustrate a side diagram and three-dimensional diagram of the suture device in a varied embodiment of the endoscopic suture device 30 of the present invention, which shows a first state that the first arm 30A and the second arm 30B are opened. FIG. 8C and FIG. 8D respectively illustrates a side diagram and three-dimensional diagram of the embodiment in a second state that the first arm 30A and the second arm 30B are closed with respect to each other. Similar with the aforementioned embodiment, only one of the ends of the needle 40 can be connected to one of the first arm 30A and the second arm 30B in the first state, and both ends of the needle 40 are respectively connected to the first arm 30A and the second arm 30B in the second state.

As illustrated in FIGS. 8A, 8B, 8C, and 8D, the endoscopic suture device 30 in the present embodiment, includes a sleeve 35 configured to move along the first direction D1 or the second direction D2.

Furthermore, in the present embodiment, a first arm elastic element 36A and a second arm elastic element 36B (such as a spring) are respectively provided inner or outer sides of the first arm 30A and the second arm 30B. As such, the first arm 30A and the second arm 30B are opened with respect to each other in the first state due to the first arm elastic element 36A and the second arm elastic element 36B. When the sleeve 35 moves along the second direction D2, the first arm 30A and the second arm 30B are forced to be closed with respect to each other and housed in the sleeve 35 (that is, switched to the second state).

On the other hand, when the sleeve 35 moves along the first direction D1, the first arm 30A and the second arm 30B will be released and opened with respect to each other (that is, switched to the first state). In the present embodiment, the first arm 30A and the second arm 30B each have a pinhole PH. The needle can be controlled, for example but not limited to by releasing control connection lines as described in the aforementioned embodiment. In the second state, both ends of the needle can be connected to the first arm 30A and the second arm 30B via inserting into the pinholes PH thereon. As illustrated in FIG. 8A and FIG. 8B, when switching to the first state from the second state, one end of the needle can be kept being connected to one of the first arm 30A and the second arm 30B by releasing the other end of the needle. Wherein the end of the needle connected to the first arm 30A or the second arm 30B is inserted into the pinhole PH.

In the present embodiment, the states of the first arm 30A and the second arm 30B can be more efficiently controlled by using the sleeve 35 configured to move along the first direction D1 and the second direction D2. The movement of the sleeve 35, for example, can be mechanically or electrically controlled by the control device at the proximal end.

Figure 9A:
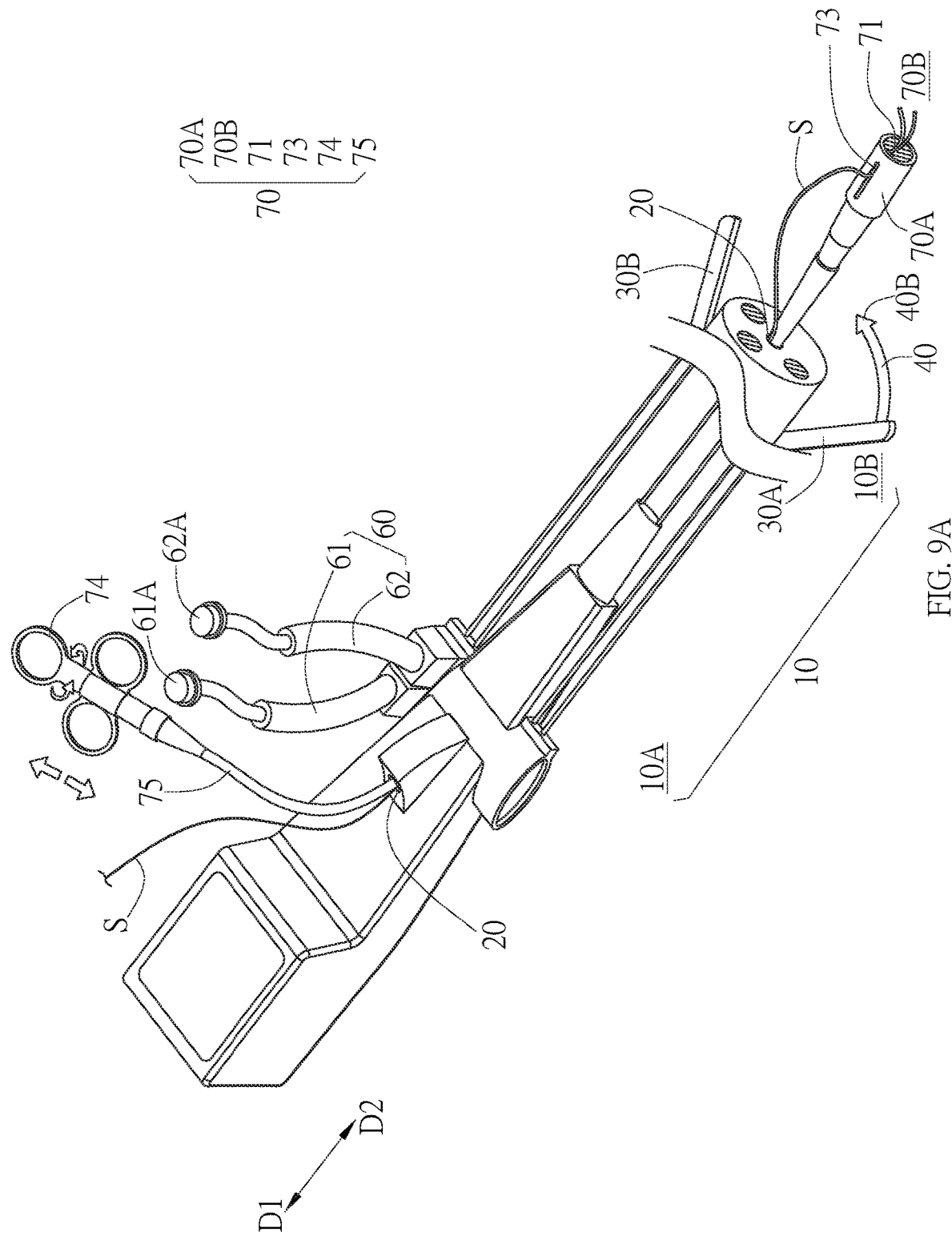
FIG. 9A is a side diagram illustrating another variation of the embodiment of the endoscopic suture device of the present invention.
Figure 9B:
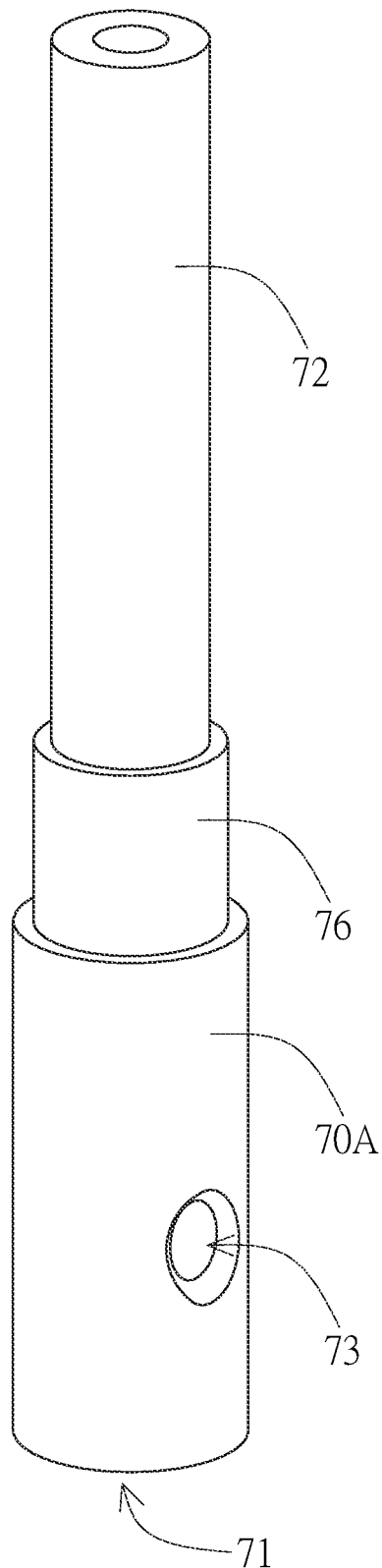
FIG. 9B is a three-dimensional diagram illustrating a suture terminating module in the embodiment illustrated in FIG. 9A.
Figure 9C:
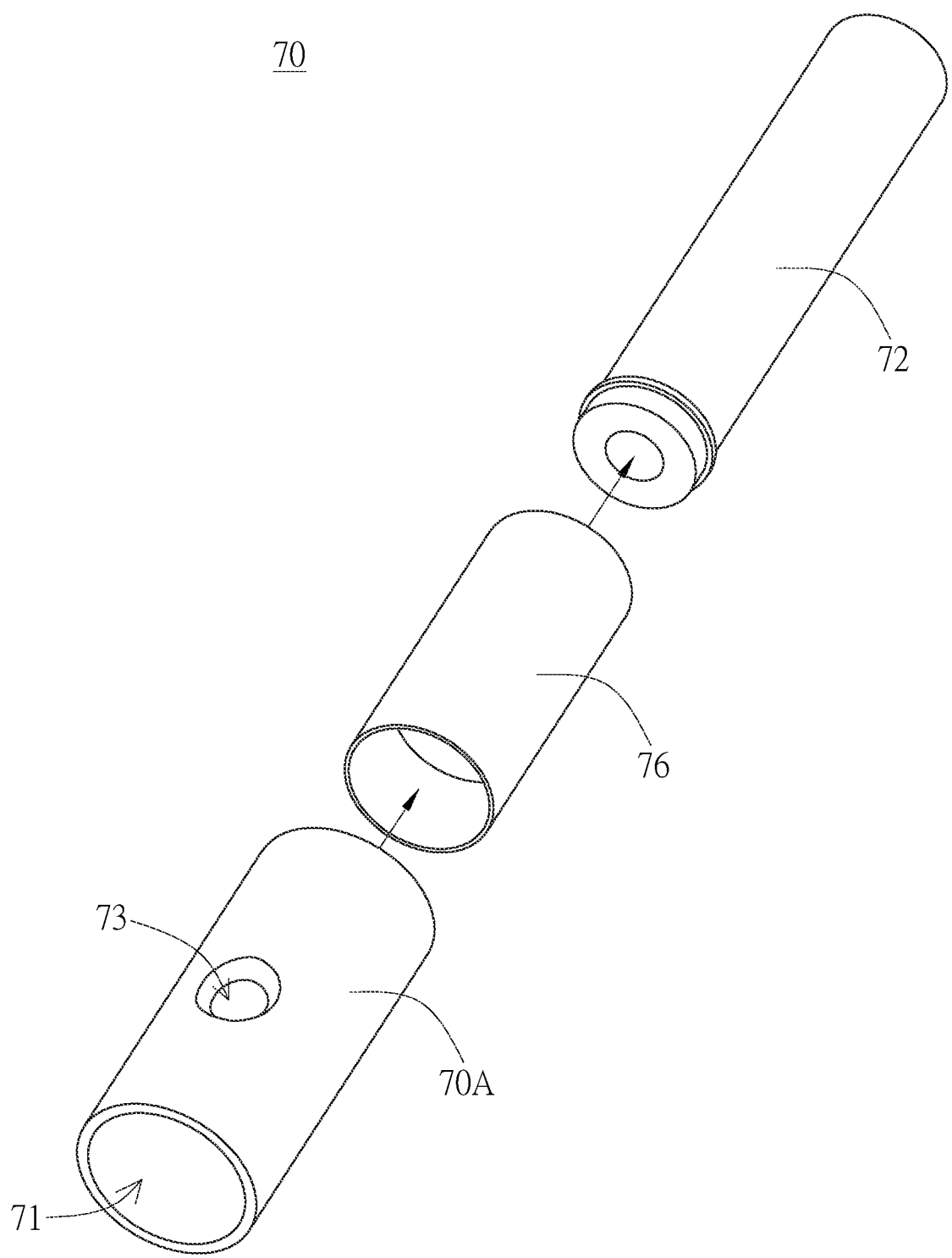
FIG. 9C is a breakdown diagram illustrating the suture terminating module in the embodiment illustrated in FIG. 9A.
Figure 9D:
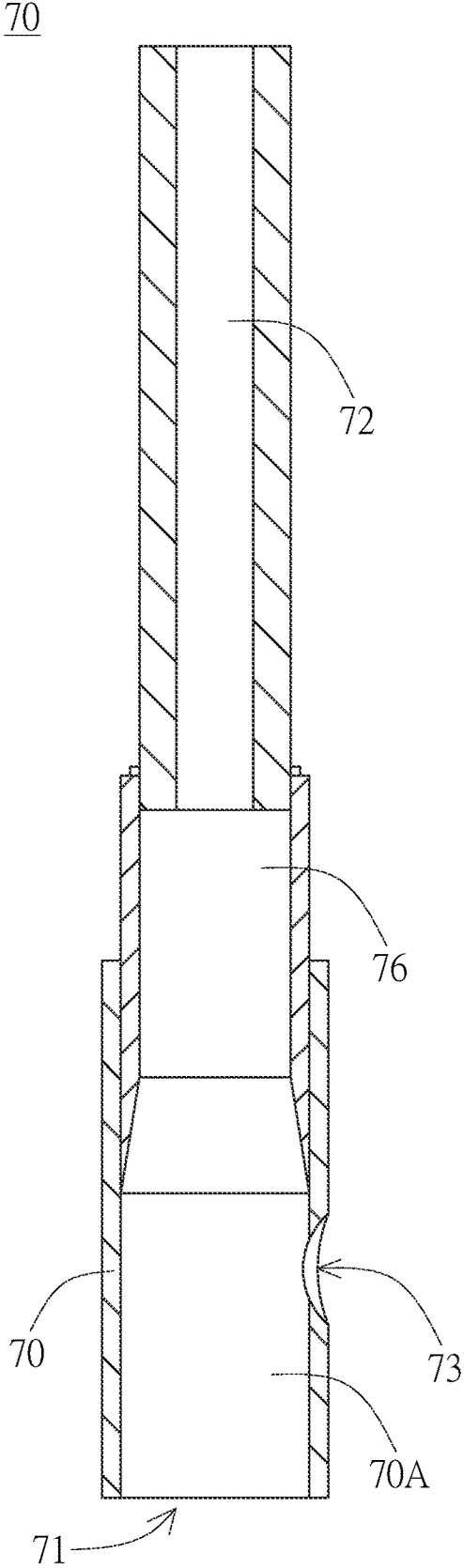
FIG. 9D is a cross-section diagram illustrating the suture terminating module in the embodiment illustrated in FIG. 9A.
Figure 9E:
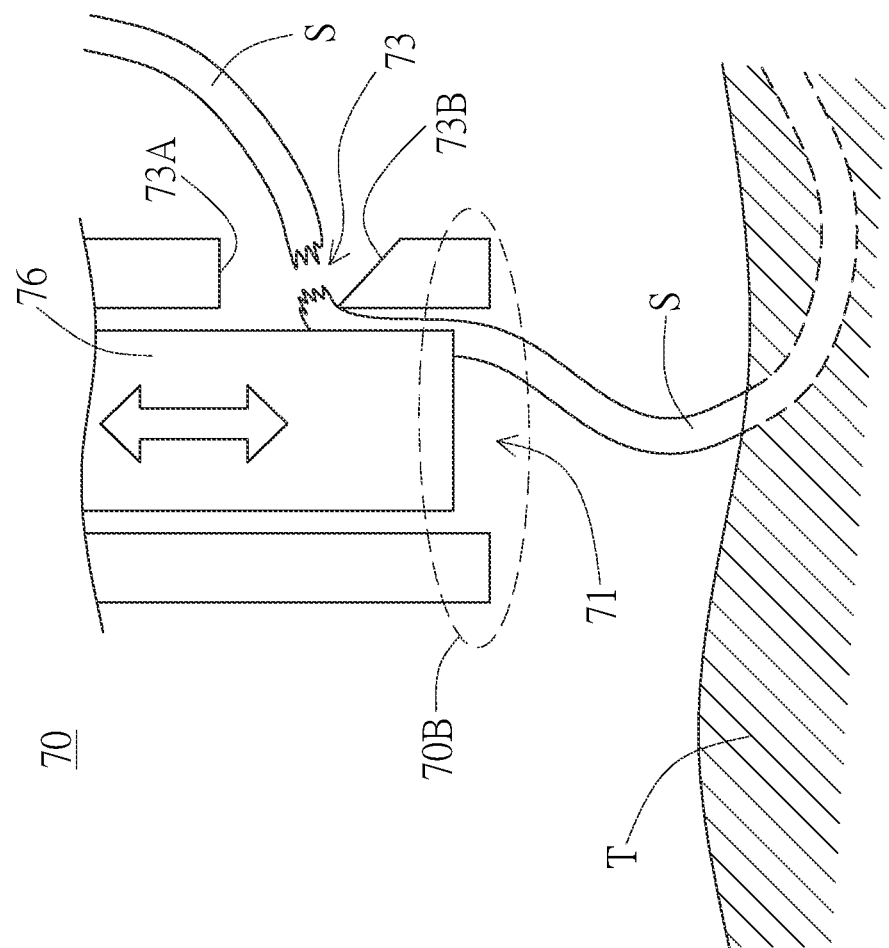
FIG. 9E is a diagram illustrating a method of using the suture terminating module in the embodiment illustrated in FIG. 9A.

Finally, a detailed embodiment of a terminating mechanism of the suture S is described. FIG. 9A illustrates a three-dimensional diagram of a variant of an embodiment of the endoscopic suture device 1 of the present invention. In the embodiment illustrated in FIG. 9A, the endoscopic suture device 1 further includes a suture terminating module 70. Please refer to FIGS. 9B to 9E together. FIGS. 9B to 9D respectively illustrate a three-dimensional diagram, a breakdown diagram, and a cross-section diagram of the suture terminating module 70 in the embodiment illustrated in FIG. 9A. In addition, FIG. 9E illustrates a diagram of an operation method of the suture terminating module 70 in the embodiment illustrated in FIG. 9A. As illustrated in FIGS. 9A to 9D, the suture terminating module 70 includes a suture terminating first cannula 70A, a suture terminating second cannula 76, and a suture terminating cannula pushing device 72. The suture terminating first cannula 70A has an open suture terminating distal end 70B to form a suture terminating channel 71. The suture terminating second cannula 76 is provided on the side opposite to the suture terminating distal end 70B. In addition, the suture terminating second cannula 76 is pushed into the suture terminating first cannula 70A by the suture terminating cannula pushing device 72. Wherein the suture terminating cannula pushing device 72 is located in the working channel 20 and the suture terminating distal end 70B protrudes toward the distal direction D2 from the working channel 20.

In the present embodiment, the suture terminating module 70 further includes a suture terminating operation unit 74 at least partially located in the proximal portion 10A and connected to the suture terminating cannula pushing device 72 via a suture terminating connection wire 75 passing through the working channel 20. Wherein the suture terminating connection wire 75 preferably consist of hard materials. Therefore, the suture terminating cannula pushing device 72 can perform a liner motion or a push back motion in the suture terminating channel 71 to change the location of the suture terminating channel 71 by a motion of the suture terminating operation unit 74 such as spinning, pushing, or pulling back, so that the portion of the suture S entering the suture terminating channel 71 is folded between the suture terminating first cannula 70A and the suture terminating second cannula 76. In the present embodiment, the suture terminating first cannula 70A has a side hole 73 provided on a side of the suture terminating first cannula 70A, and a redundant portion of the suture S is cut by the side hole 73. Wherein the side hole 73 connects the suture terminating channel 71 and an external space of the suture terminating module 70.

Specifically, as illustrated in FIG. 9E, the side hole 73 of the suture terminating first cannula 70A has a top end 73A and a bottom end 73B opposite to each other, and a cutting edge (such as a sharp bevel structure) is formed on the bottom end 73B. For example, when the suture S is wound up by using the suture terminating module 70, the suture S protruding from the object protrudes toward an external space of the suture terminating module 70 from the side hole 73 after entering the suture terminating channel 71 from the suture terminating distal end 70B. When a portion of the suture S is pushed by the suture terminating second cannula 76 and passes through the cutting edge, the suture S is cut by the cutting edge. The suture S outside the suture terminating module 70 can be withdrawn via the working channel 20. In addition, the cut suture S that remains in the suture terminating channel 71 is fixed between the suture terminating second cannula 76 and the suture terminating first cannula 70A so as to complete the terminating operation.

Figure 10A:
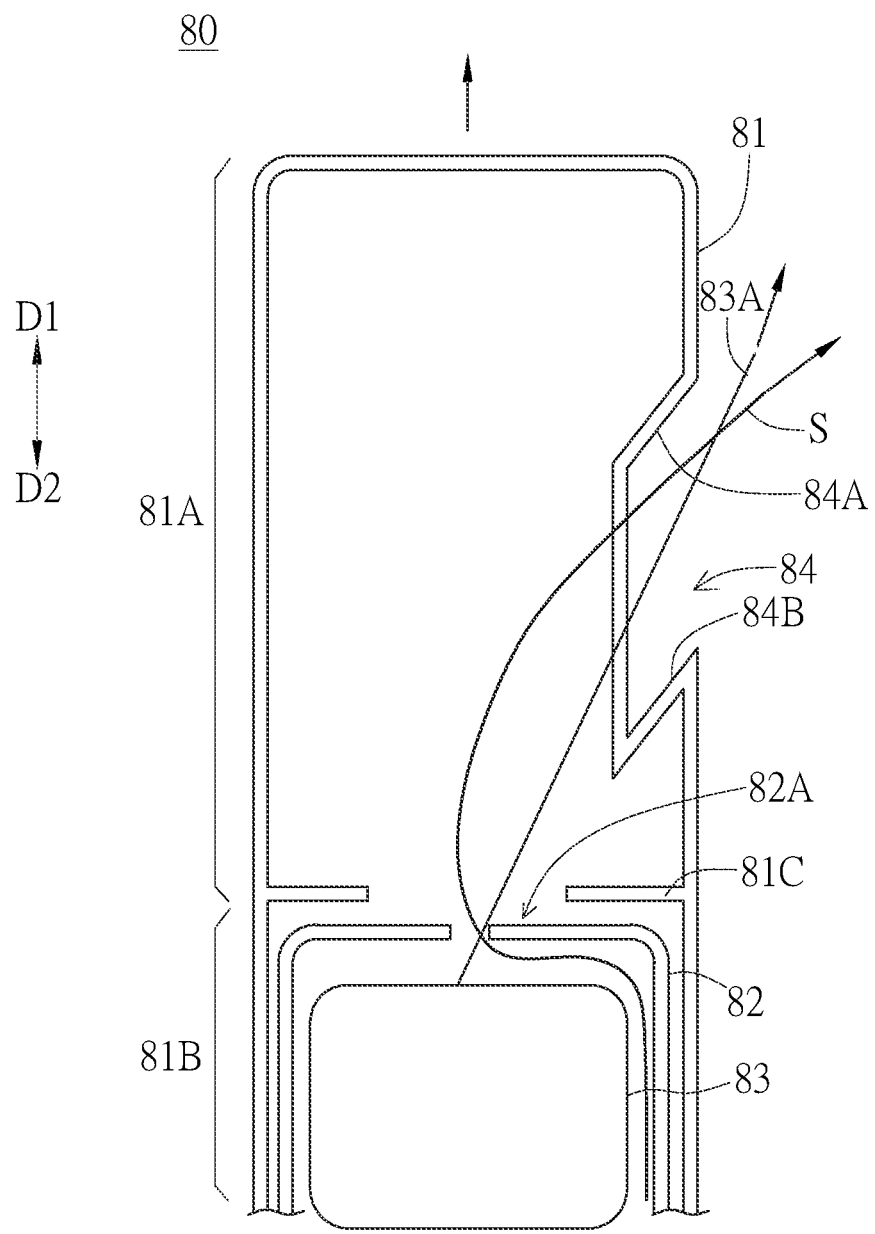
FIG. 10A is a cross-section diagram illustrating the suture terminating module in a varied embodiment.

In yet another embodiment, a suture terminating module 80 (illustrated in FIG. 10A) can be used instead of the suture terminating module 70. Referring to FIG. 10A, the suture terminating module 80 includes a cannula 81, a holder 82, and a terminator 83. In the present embodiment, the cannula 81 may have a first region 81A and a second region 81B separated by a baffle plate 81C. However, in another embodiment, the baffle plate 81C may be not provided and the cannula 81 may not include a plurality of regions. In the present embodiment, the cannula 81 has a side hole 84 and the side hole 84 may be located in the first region 81A. Wherein the side hole 84 connects the inner space of the cannula 81 and an external space of the suture terminating module 80.

In the present embodiment, the side hole 84 has a top end 84A and a bottom end 84B opposite to each other, and a cutting edge (such as a sharp bevel structure) is formed on the bottom end 84B. The holder 82 is located in the second region 81B, the terminator 83 is located within the holder 82 and the terminator 83 can be moved up or down within the holder 82 by a terminator suture 83A connected thereto. The outer peripheral of the terminator 83 can be tightly fit to the inner peripheral of the bottom of the holder 82. In the present embodiment, the suture S and the terminator suture 83A pass through the side hole 84, a hold in the middle of the baffle plate 81C, and an opening 82A on a top side of the holder 82.

After the suture process, and a portion of the suture S is tightly held between an inner wall of the holder 82 and the terminator 83 by pulling the terminator suture 83A outwardly and forcing the terminator 83 to squeeze into the bottom of the holder 82. After that, a portion of the suture S and terminator suture 83A can be cut by the cutting edge by moving the cannula 81 along the first direction D1. However, the method for cutting the suture S and terminator suture 83A is not limited thereto.

Figure 10B:
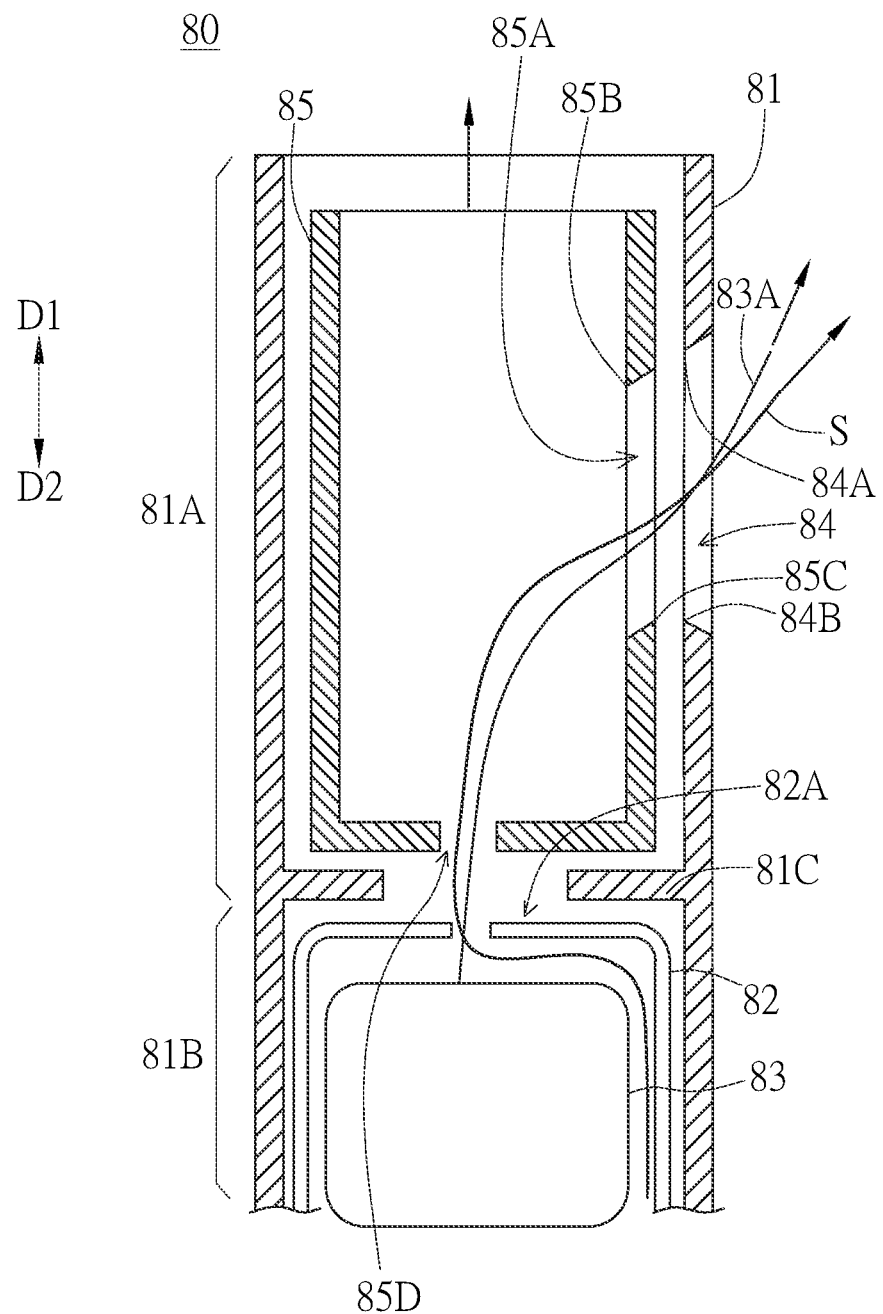
FIG. 10B is a cross-section diagram illustrating the suture terminating module in another varied embodiment.

In the embodiment illustrated in FIG. 10B, suture terminating module 80 further includes a cutting sleeve or socket 85 having a second side hole 85A and a lower hole 85D. In the present embodiment, the suture S and the terminator suture 83A pass through the second side hole 85A and the lower hole 85D in addition to the side hole 84, the hold in the middle of the baffle plate 81C, and the opening 82A on the top side of the holder 82. Wherein the second side hole 85A has a top end 85B and a bottom end 85C, and a cutting edge is formed on the bottom end 85C. The bottom end 85C and the bottom end 84B preferably extend toward different. In the present embodiment, a portion of the suture S and terminator suture 83A can be cut by the cutting edge on the bottom end 85C of the side hole 85 and the top end 84A of the side hole 84 by moving the cutting sleeve or socket 85 along the first direction D1 instead of moving instead of the cannula 81 along the first direction D1.

The present invention has been described in detail through the aforementioned embodiments; however, the aforementioned embodiments merely represent examples of the present invention. It should be noted that the disclosed embodiment does not intend to limit the scope of the present invention. On the contrary, essences, modifications or equivalents of claims are included in the scope of the present invention. In addition, one embodiment of the present specification can be appropriately combined to another embodiment thereof.

What is claimed:

1. An endoscopic suture device, comprising:
   an endoscope body, having a proximal portion and a distal portion opposite to each other; wherein the endoscope body has a working channel, the working channel connecting the proximal portion and the distal portion;
   a suture device provided on and connecting to the distal portion, and including a first arm and a second arm opposite to each other, the first arm and the second arm extending toward a distal direction, wherein the first arm and the second arm are pivotally connected to the distal portion, and the first arm and the second arm are configured to be independently, simultaneously, and separately opened or closed with respect to the other of the first arm and the second arm; and
   a needle provided between the first arm and the second arm,
   wherein two ends of the needle respectively, selectively, and separately connected to the first arm and the second arm.

2. The endoscopic suture device of claim 1, further comprising:
   a suture connected to the needle via the working channel.

3. The endoscopic suture device of claim 1, further comprising a tissue capturing device, the tissue capturing device at least partially protruding toward the distal direction from the working channel.

4. The endoscopic suture device of claim 3, wherein the tissue capture is a clamp-shaped device, and the clamp-shaped device is operated by a capture operation unit disposed on the proximal portion.

5. The endoscopic suture device of claim 3, wherein the tissue capturing device is a needle-shaped capture module, and a needle-shaped capturing portion in the needle-shaped capture module at least partially protrudes toward the distal direction from the working channel, and
   wherein the needle-shaped capturing portion is at least partially covered by a needle outer tube, and the needle-shaped capturing portion at least partially protrudes from the needle outer tube.

6. The endoscopic suture device of claim 5, further comprising:
   a capturing operation unit, connected to the needle-shaped capturing portion via the working channel,
   wherein the capturing operation unit and the needle-shaped capturing portion are opposite sides of the needle outer tube, and
   wherein the capturing operation unit is configured to control movement and location of the needle-shaped capturing portion by rectilinear motion, rotational motion, or pull back motion.

7. The endoscopic suture device of claim 5, wherein the needle-shaped capturing portion has a plurality of barb structures so as to prevent the needle-shaped capturing portion being separated from a captured target after inserting the captured target.

8. The endoscopic suture device of claim 1, wherein the needle has a first tip and a second tip opposite to each other,
   wherein the needle is connected to the first arm via the first tip and the first tip is covered by the first arm when the needle is connected to the first arm, and
   wherein the needle is connected to the second arm via the second tip and the second tip is covered by the second arm when the needle is connected to the second arm.

9. The endoscopic suture device of claim 8, further comprising a first releasing control line, the first releasing control line provided on a side of the endoscope body and extending into the first arm from the proximal portion, wherein the first arm having:
   a first connecting portion at least partially controlled by the first releasing control line so as to release the first tip.

10. The endoscopic suture device of claim 1, further comprising a control device provided on the proximal portion and configured to switch between a first state and a second state,
    wherein in the first state, only one of the two ends of the needle is connected to either the first arm or the second arm corresponding the one of the two ends, and one of the first arm and the second arm is opened with respect to the other of the first arm and the second arm, and
    wherein when switched to the second state, one of the first arm and the second arm is moved toward the other of the first arm and the second arm, and the two ends of the needle are respectively and separately connectable to both the first arm and the second arm.

11. The endoscopic suture device of claim 10, wherein the control device includes a first portion and a second portion, wherein the first portion is configured to control the first arm and the second portion is configured to control the second arm,
    wherein a first switching portion is located on the first portion, the first switching portion is electrically or mechanically connected to the first arm, and a second switching portion is located on the second portion, the second switching portion is electrically connected to the second arm.

12. The endoscopic suture device of claim 11, wherein the control device further includes:
a first opening and closing control connection line controlled by the first portion and connected to the first arm so as to adjust opening and closing of the first arm; and
a second opening and closing control connection line controlled by the second portion and connected to the second arm so as to adjust opening and closing of the second arm.

13. The endoscopic suture device of claim 11, wherein the control device further includes:
a first releasing control connection line controlled by the first switching portion and connected to the first arm; and
a second releasing control connection line controlled by the second switching portion and connected to the second arm.

14. The endoscopic suture device of claim 13, wherein the first switching portion and the second switching portion are pull switches,
wherein the first switching portion is mechanically connected to the first releasing control line, when the first switching portion is pulled, the first releasing control line moves toward a proximal direction so that the first tip is released from the first arm, and
wherein the second switching portion is mechanically connected to the second releasing control line, when the second switching portion is pulled, the second releasing control line moves toward the proximal direction so that the second tip is released from the second arm.

15. The endoscopic suture device of claim 11, wherein the first portion and the second portion are provided on a side surface of the proximal portion, and rotating shafts of the first portion and the second portion are perpendicular to the endoscope body.

16. The endoscopic device of claim 10, wherein the suture device further includes a sleeve configured to move toward the distal direction or a proximal direction opposite to the distal direction,
wherein a first arm elastic element is provided on an inner side or an outer side of the first arm,
wherein a second arm elastic element is provided on an inner side or an outer side of the second arm, and
wherein the sleeve is configured to move toward the distal direction when switched to the second state from the first state, and
wherein the sleeve is configured to move toward the proximal direction when switched to the first state from the second state.

17. The endoscopic suture device of claim 2, further comprising a suture terminating module, the suture terminating module at least partially extending toward the distal direction from the working channel, the suture terminating module having:
a suture terminating first cannula having a suture terminating distal end to form a suture terminating channel, the suture terminating distal end protruding toward the distal direction from the working channel;
a suture terminating second cannula disposed on a side opposite to the suture terminating distal end;
a suture terminating cannula pushing device configured to push the suture terminating second cannula into the suture terminating first cannula by moving toward the distal direction; and
a suture terminating operation unit at least partially located at the proximal portion and connected to the suture terminating cannula pushing device via the working channel so as to adjust the location of the suture terminating cannula pushing device; wherein the suture terminating first cannula has a side hole disposed on a side surface of the suture terminating first cannula so that a portion of the suture entering the suture terminating channel from the suture terminating distal end protrudes out of the suture terminating first cannula,
wherein suture terminating first cannula having a top end and a bottom end opposite to each other on the side hole, wherein the bottom end has a cutting side, and
wherein the suture is cut by the cutting side when a portion of the suture is pushed by the suture terminating second cannula and crosses over the cutting side.

18. The endoscopic suture device of claim 2, further comprising a suture terminating module, the suture terminating module at least partially extending toward the distal direction from the working channel, the suture terminating module having:
a cannula having a side hole;
a holder located within the cannula and having an opening on a top side thereof; and
a terminator located with the holder and connected with a terminator suture passing through the side hole and the opening,
wherein a portion of the suture is held between an inner wall of the holder and the terminator.

19. The endoscopic suture device of claim 18, wherein the cannula includes a first region and a second region separated with each other with a baffle plate therebetween,
wherein the side hole is provided within the first region, and
wherein the holder is located within the second region.

20. The endoscopic suture device of claim 18, wherein the cutting edge is formed on a bottom end of the side hole.

21. The endoscopic suture device of claim 18, wherein the suture terminating module further includes a cutting socket or a cutting sleeve in the cannula,
wherein the suture terminating module having a second side hole and a lower hole,
wherein the suture and the terminator suture are configured to pass through the second side hole and the lower hole, and
wherein a cutting edge is formed on a bottom end of the second side hole.

22. The endoscopic suture device of claim 6, wherein the needle-shaped capturing portion has a plurality of barb structures so as to prevent the needle-shaped capturing portion being separated from a captured target after inserting the captured target.

23. An operation method of the endoscopic suture device of claim 1, comprising:
inserting the endoscopic suture device into a target in a second state where the two ends of the needle are separately connected to both the first end and the second end;
switching to a first state where only one of the two ends of the needle is connected to one of the first arm or the second arm after inserting into the target;

switching to the second state where the both ends of the needle are separately connected to the first arm and the second arm after capturing at least portion of the target so that the needle penetrates the at least portion of the target; and switching to the first state where only the other of the two ends is connected to the other of the first arm and the second arm.

24. The operation method of claim 23, further comprising:
capturing the at least portion of the target using a tissue capturing device provide on the working channel and protruding toward the distal direction from the working channel.

25. The operation method of claim 23, wherein endoscopic suture device includes:
a suture terminating module, including:
  a suture terminating first cannula having a suture terminating distal end to form a suture terminating channel, the suture terminating distal end protruding toward the distal direction from the working channel;
  a suture terminating second cannula disposed on a side opposite to the suture terminating distal end; and
  a suture terminating cannula pushing device configured to push the suture terminating second cannula into the suture terminating first cannula by moving toward the distal direction, wherein the operation method further comprises:
  making at least portion of a suture enter a suture terminating channel of the suture terminating first cannula;
  making the portion of the suture entering the suture terminating module protrude out of the suture terminating module from a side hole of the suture terminating module;
  moving the suture terminating second cannula toward the distal direction by using the suture terminating cannula pushing device so as to hold a portion of the suture located in the suture terminating channel; and
  pushing the suture by using the suture terminating second cannula to cross over a cutting side formed on a bottom end of the side hole to cut the suture so that a portion of the suture located in the suture terminating channel is fixed between the suture terminating second cannula and an inner side of the suture terminating channel.

* * * * *